United States Patent
Furukawa et al.

(10) Patent No.: US 9,176,791 B2
(45) Date of Patent: Nov. 3, 2015

(54) COMPUTER-READABLE RECORDING MEDIUM, EXCLUSION CONTROL APPARATUS, AND EXCLUSION CONTROL METHOD

(71) Applicant: FUJITSU LIMITED, Kawasaki-shi, Kanagawa (JP)

(72) Inventors: Masakazu Furukawa, Yoro (JP);
Yusuke Kuchiwaki, Nagoya (JP);
Takashi Ikezaki, Yatomi (JP)

(73) Assignee: FUJITSU LIMITED, Kawasaki (JP)

( * ) Notice: Subject to any disclaimer, the term of this patent is extended or adjusted under 35 U.S.C. 154(b) by 234 days.

(21) Appl. No.: 13/854,306

(22) Filed: Apr. 1, 2013

(65) Prior Publication Data

US 2013/0347001 A1   Dec. 26, 2013

(30) Foreign Application Priority Data

Jun. 25, 2012   (JP) .................. 2012-142425

(51) Int. Cl.
    G06F 9/46    (2006.01)
    G06F 9/52    (2006.01)
    G06F 9/50    (2006.01)

(52) U.S. Cl.
    CPC .............. *G06F 9/52* (2013.01); *G06F 9/5038* (2013.01); *G06F 9/526* (2013.01); *G06F 2209/5021* (2013.01)

(58) Field of Classification Search
    USPC ........................................... 718/106
    See application file for complete search history.

(56) References Cited

U.S. PATENT DOCUMENTS

| | | | |
|---|---|---|---|
| 8,413,150 B2 * | 4/2013 | Lu et al. ................. | 718/100 |
| 2004/0123294 A1 | 6/2004 | Fussell | |
| 2004/0148607 A1 * | 7/2004 | Circenis et al. .......... | 718/102 |
| 2011/0153555 A1 * | 6/2011 | Falkenberg et al. ....... | 707/608 |
| 2013/0006701 A1 * | 1/2013 | Guven et al. ............ | 705/7.28 |

FOREIGN PATENT DOCUMENTS

| | | |
|---|---|---|
| JP | 2006-511857 | 4/2006 |
| WO | WO 2004/057462 A2 | 7/2004 |

* cited by examiner

*Primary Examiner* — Emerson Puente
*Assistant Examiner* — Steven Do
(74) *Attorney, Agent, or Firm* — Oblon, McClelland, Maier & Neustadt, L.L.P.

(57) ABSTRACT

A exclusion control method includes setting, for at least one or more operation information defining operations for an information processing apparatus and being included in a plurality of work flow information that indicate operation procedures, exclusive sections that indicate units of exclusion control performing an exclusive lock, calculating priorities of the exclusive sections using operation importance level information that indicate importance levels of the operations according to types of the operation information and operation urgency level information that indicate an urgency levels of the operations, when the operations are executed based on the operation information corresponding to the exclusive sections of the plurality of workflow information, and executing the exclusion control in the exclusive sections for a plurality of workflow based on the priorities, when a competitive regarding the exclusive lock occurs between the exclusive sections.

20 Claims, 40 Drawing Sheets

FIG. 7

| EXCLUSIVE SECTION NAME FOR WHICH EXCLUSIVITY ACQUISITION IS COMPLETED | EXCLUSIVE SECTION NAME FOR WHICH EXCLUSIVITY IS TO BE ACQUIRED | | | | |
|---|---|---|---|---|---|
| | A | B | C | A+X | A+Y |
| A | ○ | × | × | ○ | ○ |
| B | × | ○ | × | × | × |
| C | × | × | ○ | × | × |
| A+X | ○ | × | × | ○ | × |
| A+Y | ○ | × | × | × | ○ |

○ : IN A COMPETITIVE RELATIONSHIP
× : NOT IN A COMPETITIVE RELATIONSHIP

FIG. 9
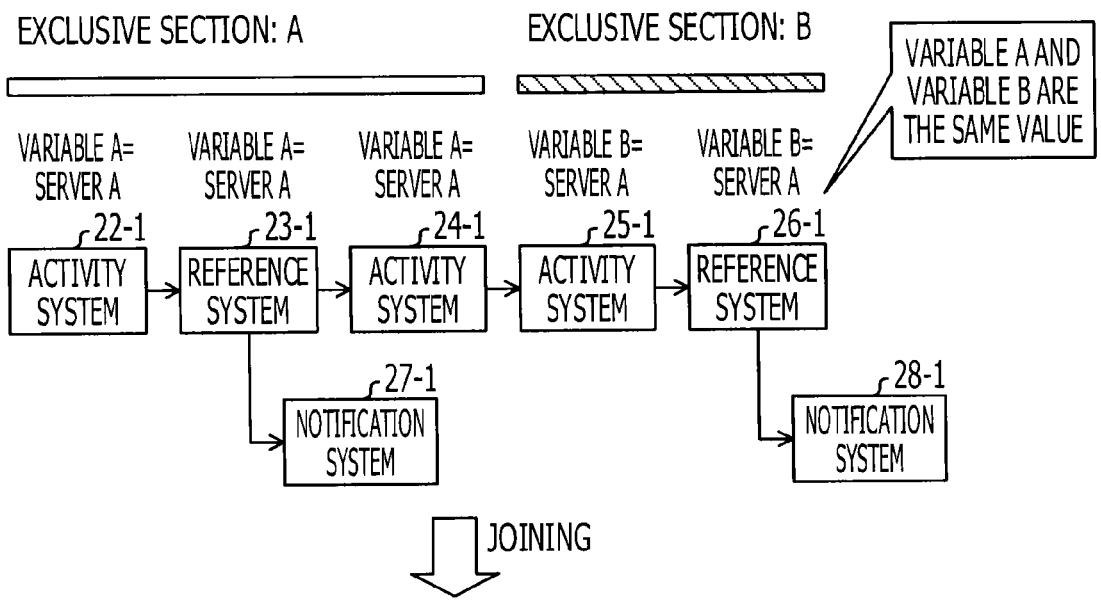
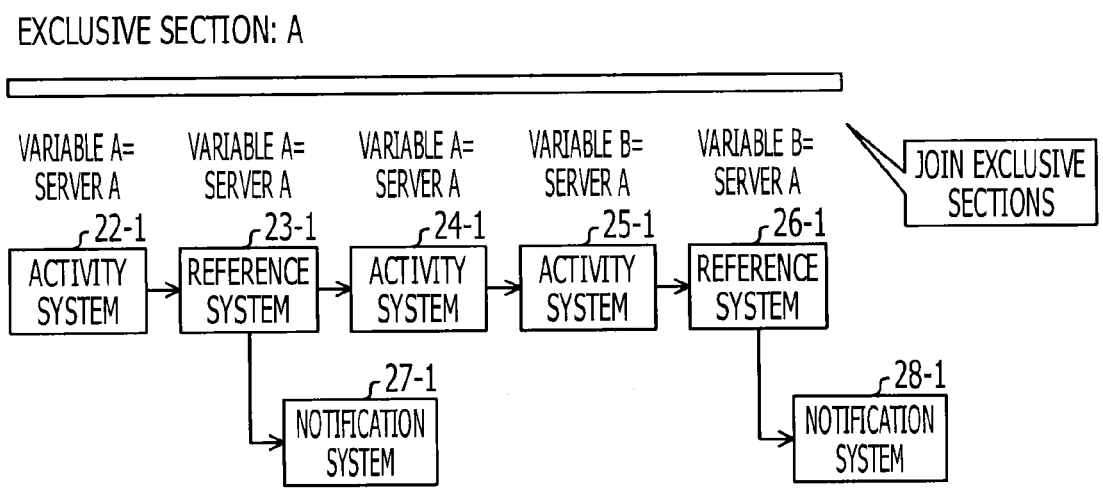

FIG. 10
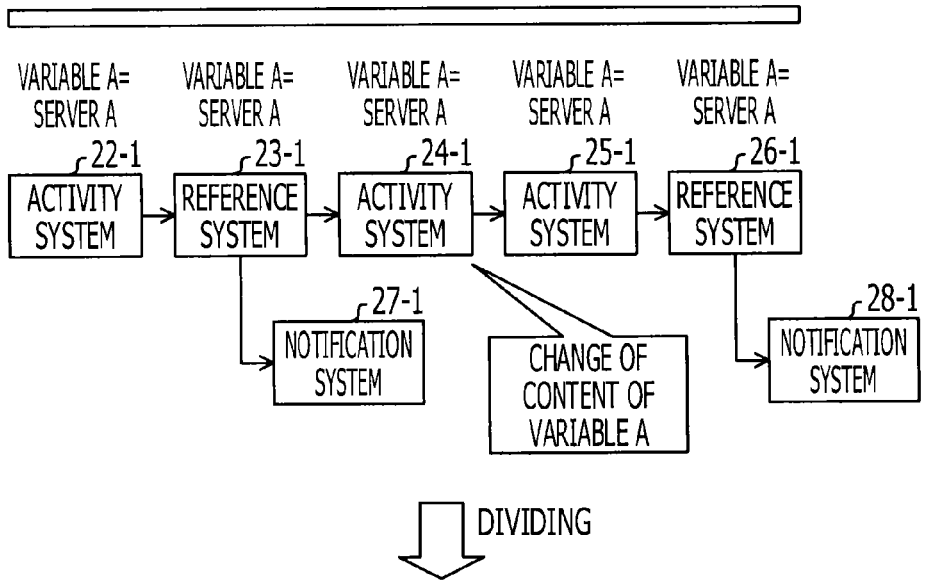
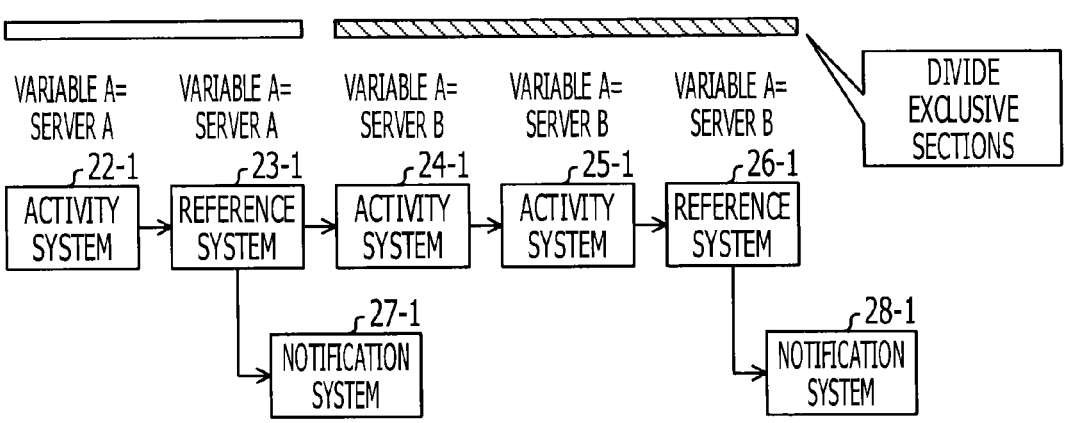

FIG. 12
WORKFLOW A USER COEFFICIENT: 2.0 STARTING METHOD COEFFICIENT: 1.0 TIME COEFFICIENT: 2.0
▼ (S11) EXCLUSIVITY RELEASE AWAITING OF WORKFLOW C
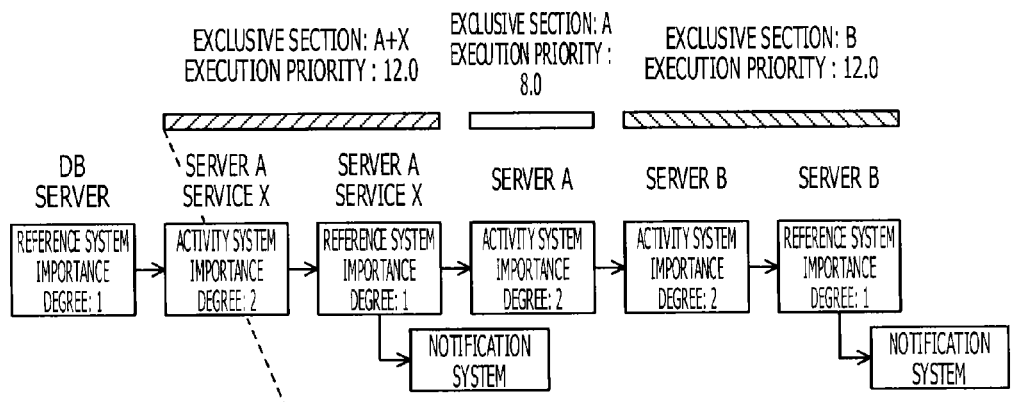
WORKFLOW B USER COEFFICIENT: 2.0 STARTING METHOD COEFFICIENT: 1.0 TIME COEFFICIENT: 1.5
▼ ─────▷ (S12) ACQUIRE EXCLUSIVITY
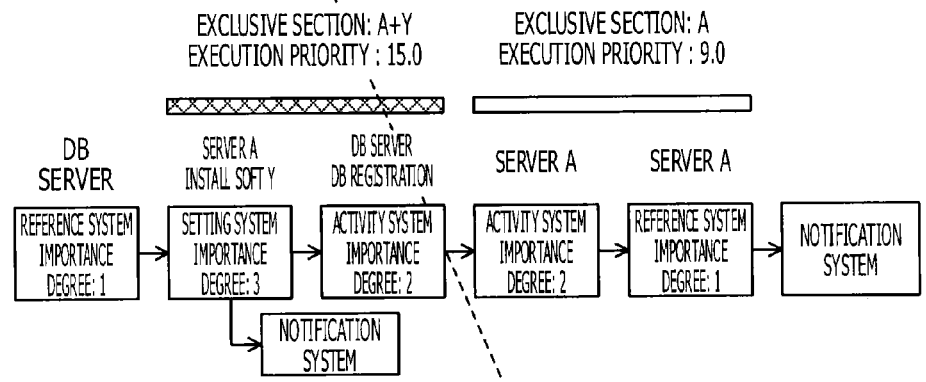
WORKFLOW C USER COEFFICIENT: 3.0 STARTING METHOD COEFFICIENT: 3.0 TIME COEFFICIENT: 1.0
▼ ─────▷ (S13) ACQUIRE EXCLUSIVITY
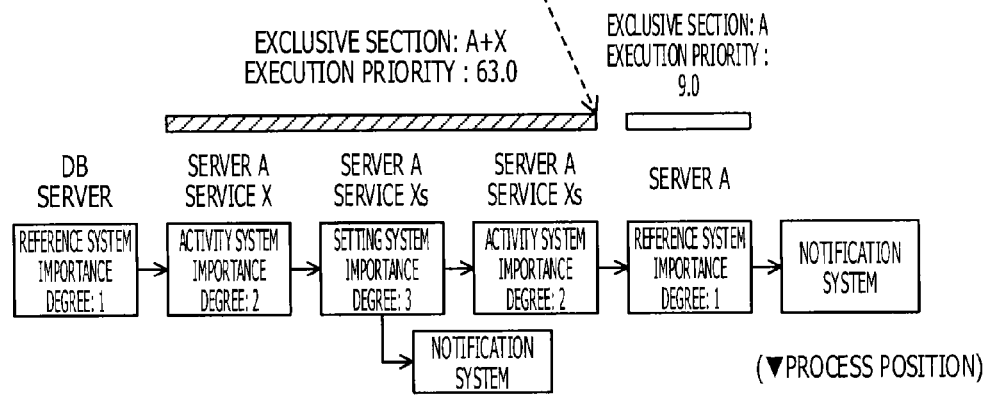
(▼PROCESS POSITION)

FIG. 13
WORKFLOW A USER COEFFICIENT: 2.0 STARTING METHOD COEFFICIENT: 1.0 TIME COEFFICIENT: 2.0
▼ ⟶ (S14) ACQUIRE EXCLUSIVITY
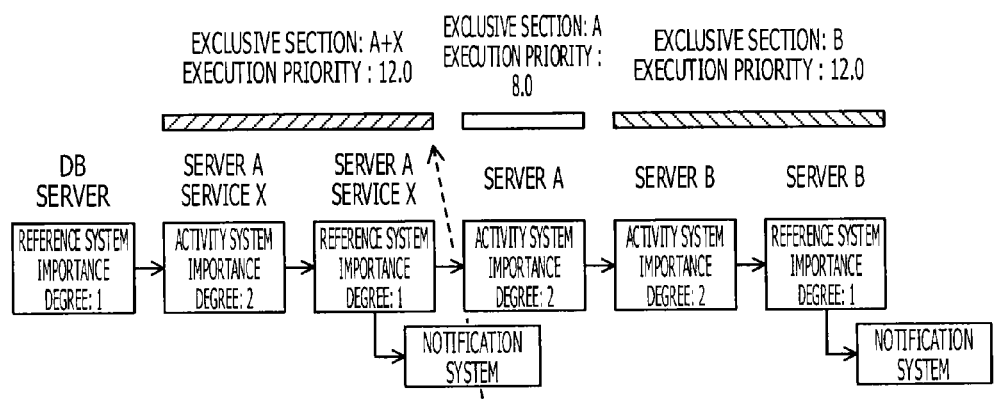
WORKFLOW B USER COEFFICIENT: 2.0 STARTING METHOD COEFFICIENT: 1.0 TIME COEFFICIENT: 1.5
▼ ⟶ DURING PROCESSING
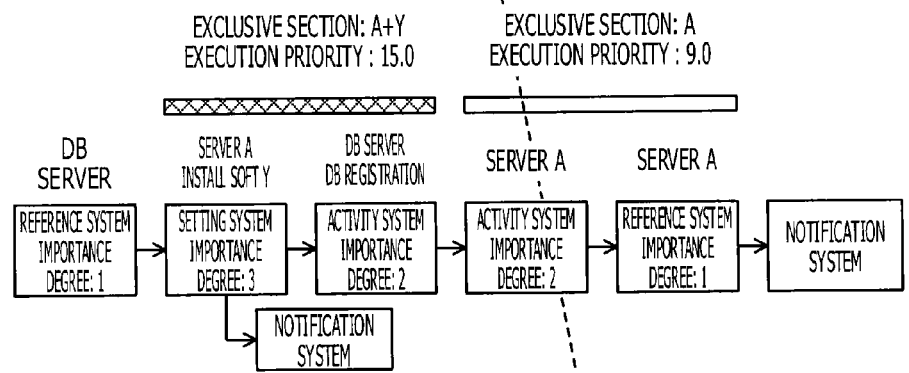
WORKFLOW C USER COEFFICIENT: 3.0 STARTING METHOD COEFFICIENT: 3.0 TIME COEFFICIENT: 1.0
▼ (S15) EXCLUSIVITY RELEASE AWAITING OF WORKFLOW A
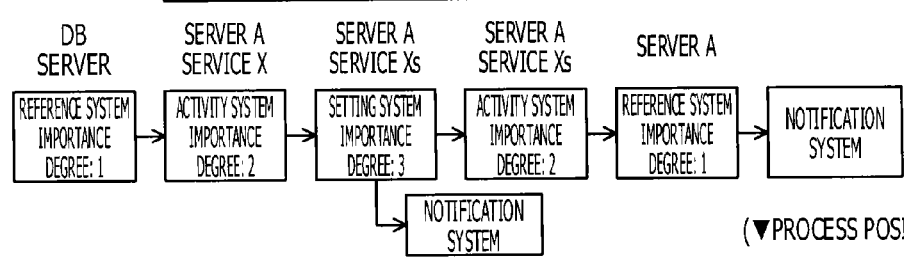
(▼PROCESS POSITION)

FIG. 14

WORKFLOW A USER COEFFICIENT: 2.0 STARTING METHOD COEFFICIENT: 1.0 TIME COEFFICIENT: 2.0

▼ (S17) EXCLUSIVITY RELEASE AWAITING OF WORKFLOW C

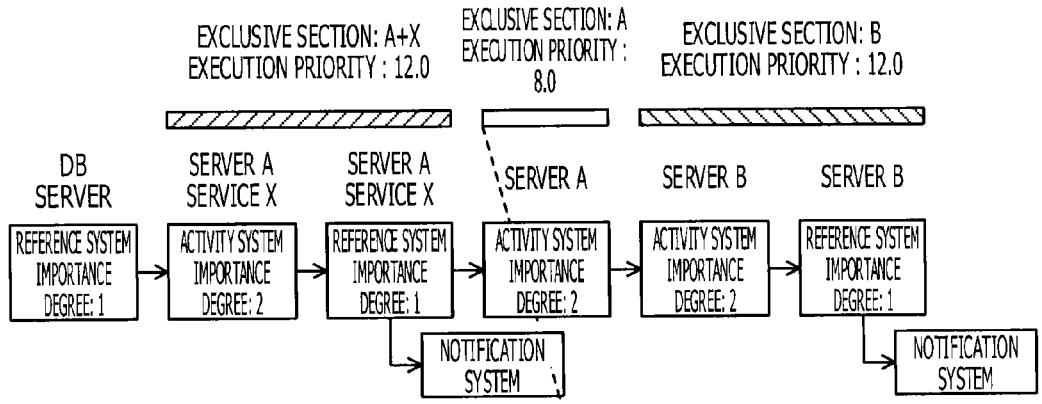

WORKFLOW B USER COEFFICIENT: 2.0 STARTING METHOD COEFFICIENT: 1.0 TIME COEFFICIENT: 1.5

▼ (S17) EXCLUSIVITY RELEASE AWAITING OF WORKFLOW C

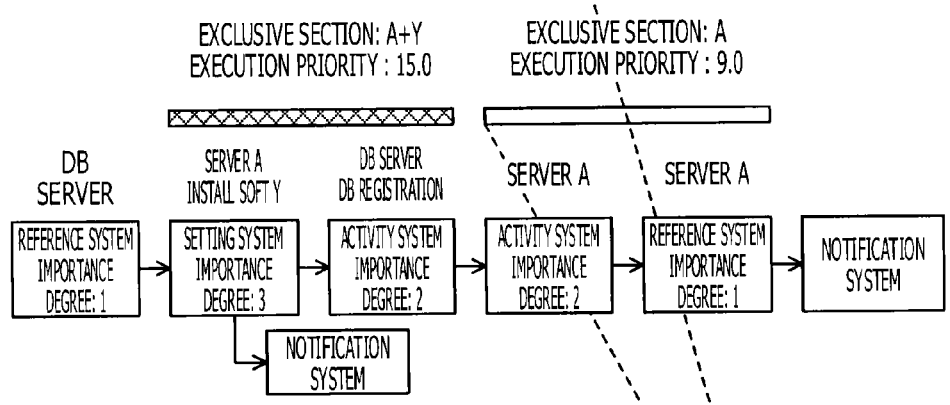

WORKFLOW C USER COEFFICIENT: 3.0 STARTING METHOD COEFFICIENT: 3.0 TIME COEFFICIENT: 1.0

▼ ──→ (S16) ACQUIRE EXCLUSIVITY

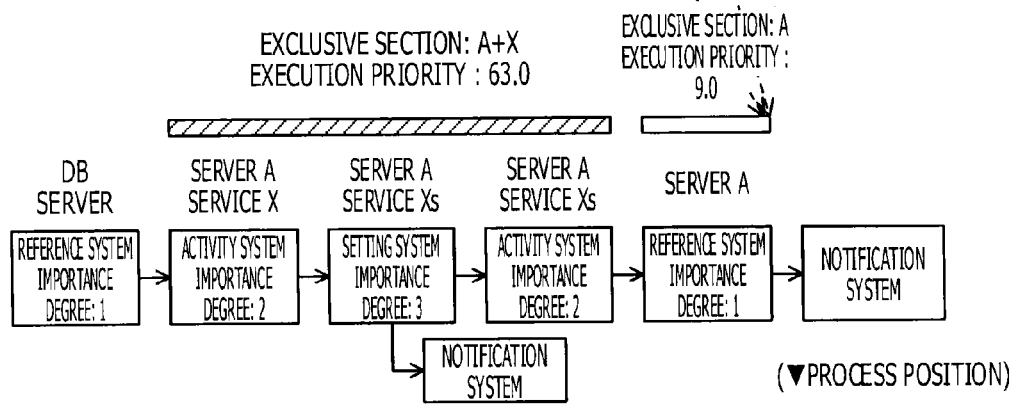

(▼PROCESS POSITION)

FIG. 15
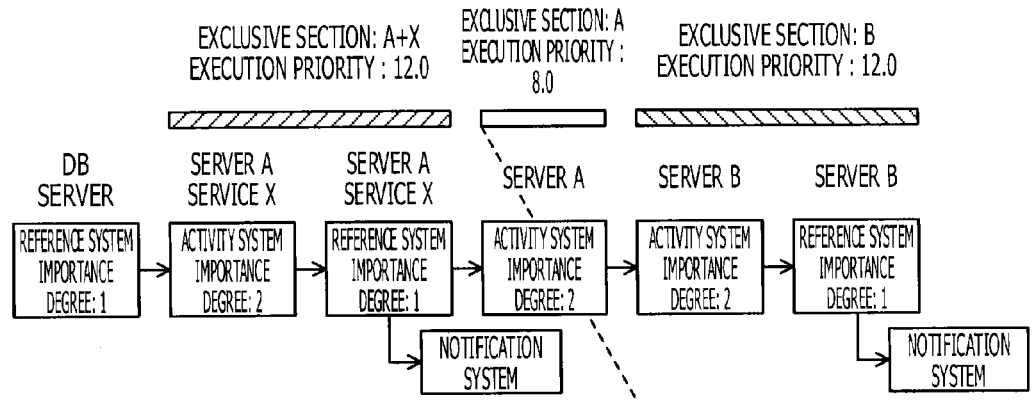
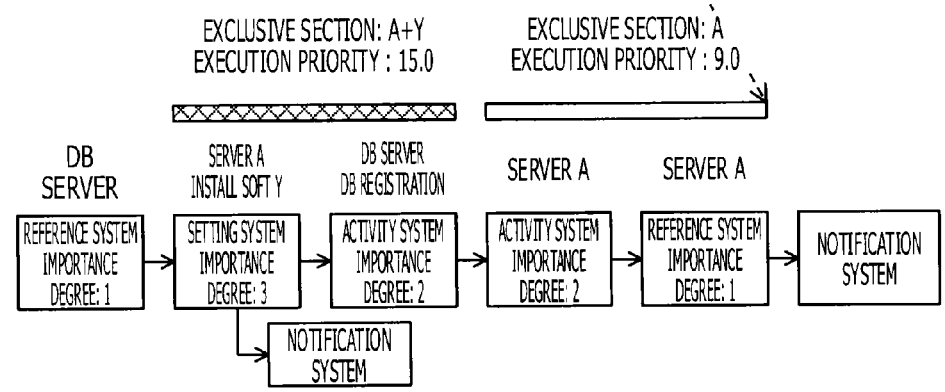
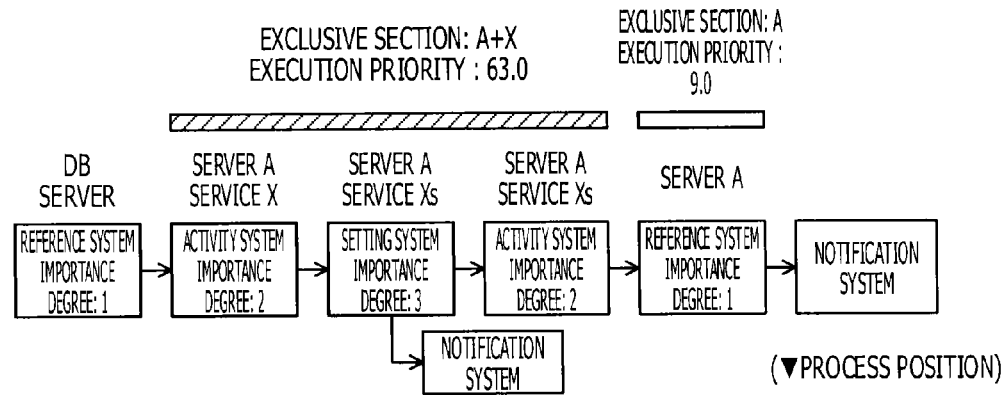

FIG. 16
WORKFLOW A USER COEFFICIENT: 2.0 STARTING METHOD COEFFICIENT: 1.0 TIME COEFFICIENT: 1.0
▼ (S21) EXCLUSIVITY RELEASE AWAITING OF WORKFLOW B
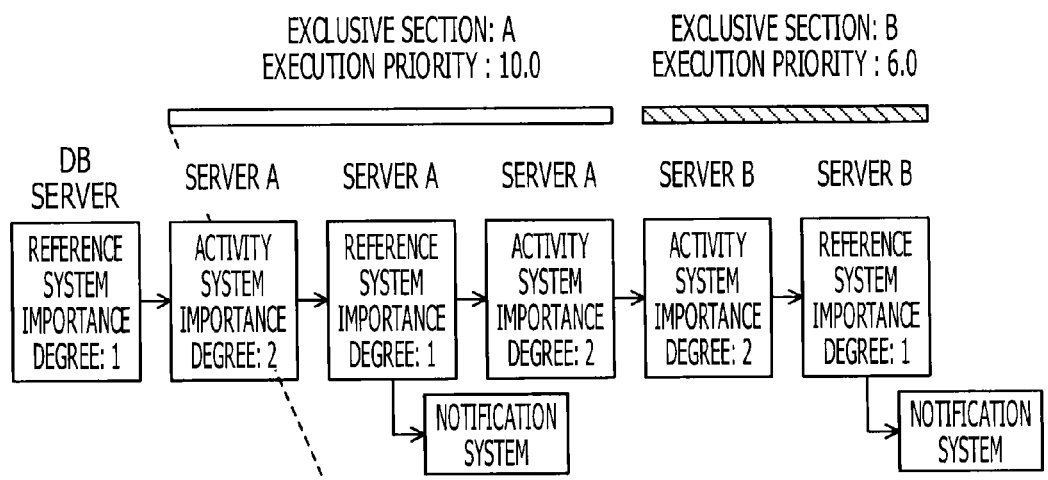
WORKFLOW B USER COEFFICIENT: 2.0 STARTING METHOD COEFFICIENT: 2.0 TIME COEFFICIENT: 1.0
▼ DURING PROCESSING
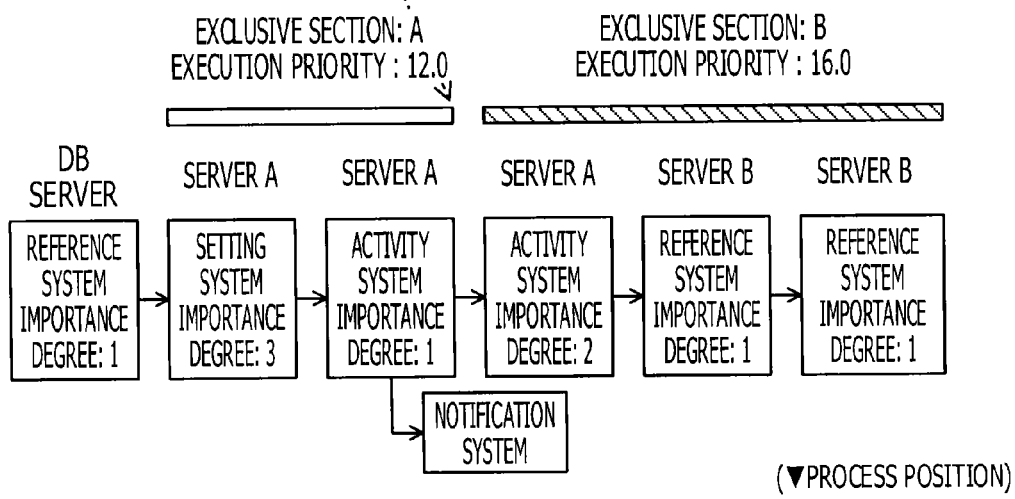
(▼PROCESS POSITION)

FIG. 17
WORKFLOW A USER COEFFICIENT: 2.0 STARTING METHOD COEFFICIENT: 1.0 TIME COEFFICIENT: 1.5
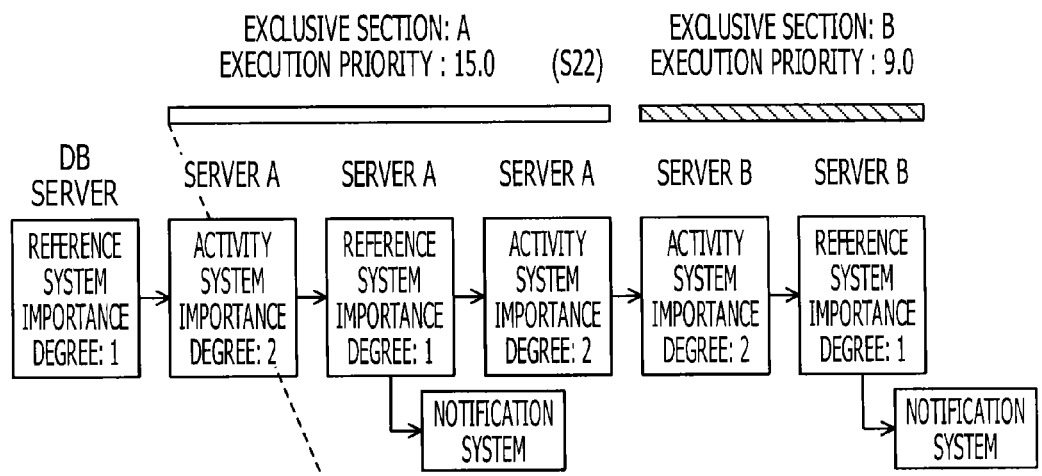
WORKFLOW B USER COEFFICIENT: 2.0 STARTING METHOD COEFFICIENT: 2.0 TIME COEFFICIENT: 1.0
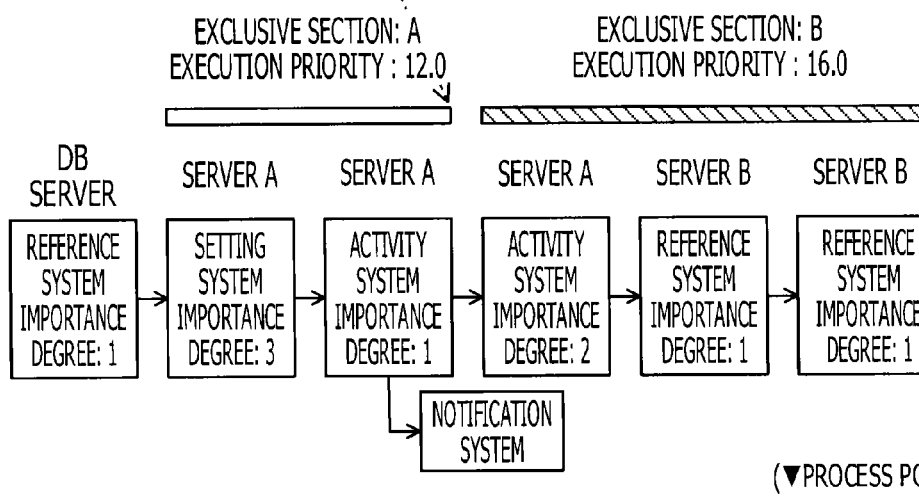
(▼PROCESS POSITION)

FIG. 22

| WORKFLOW NO. 61-1 | COMPONENT NO. 61-2 | OPERATION ACTIVITY COMPONENT NAME 61-3 | ACTIVITY TARGET 61-4 | ACTIVITY SERVICE, RESOURCES 61-5 | ... | OUTPUT 61-6 | ... | NEXT COMPONENT NO. 61-7 |
|---|---|---|---|---|---|---|---|---|
| 1 | 0 | START | – | – | ... | | ... | 1 |
| | 1 | ACQUIRE ACTIVITY TARGET, RESOURCES | – | – | ... | VARIABLE 2 | ... | 2 |
| | 2 | STOP SERVICE | VARIABLE 1 | VARIABLE 2 | ... | VARIABLE 3 | ... | 3 |
| | 3 | CONFIRM SERVICE STOP | VARIABLE 1 | VARIABLE 2 | ... | VARIABLE 3 | ... | 4,5 |
| | 4 | STOP SERVER | VARIABLE 1 | – | ... | | ... | 6 |
| | 5 | MAIL SENDING (ERROR NOTIFICATION) | – | – | ... | | ... | 99 |
| | 6 | START SERVER | VARIABLE 1 | – | ... | | ... | 7 |
| | 7 | CONFIRM SERVER START | VARIABLE 1 | – | ... | | ... | 8,9 |
| | 8 | START SERVICE | VARIABLE 1 | VARIABLE 2 | ... | VARIABLE 3 | ... | 10 |
| | 9 | SEND MAIL (ERROR NOTIFICATION) | – | – | ... | | ... | 99 |
| | 10 | CONFIRM SERVICE START | VARIABLE 1 | VARIABLE 2 | ... | VARIABLE 3 | ... | 11,99 |
| | 11 | SEND MAIL (ERROR NOTIFICATION) | – | – | ... | | ... | 99 |
| | 99 | END | – | – | ... | | ... | – |
| 2 | 0 | START | – | – | ... | | ... | 1 |
| | 1 | ACQUIRE ACTIVITY TARGET, RESOURCES | – | – | ... | VARIABLE 2 | ... | 2 |
| | 2 | CONFIRM SERVER START | VARIABLE 1 | – | ... | | ... | 3,4 |
| | 3 | INSTALL SOFTWARE | VARIABLE 1 | VARIABLE 2 | ... | VARIABLE 3 | ... | 99 |
| | 4 | SEND MAIL (ERROR NOTIFICATION) | – | – | ... | | ... | 99 |
| | 99 | END | ... | ... | ... | | ... | – |
| ... | ... | | | | | | | |

| OPERATION ACTIVITY COMPONENT NAME | COMPONENT CLASSIFICATION | ACTIVITY/ CONFIRMATION TARGET | ACTIVITY IMPORTANCE DEGREE |
|---|---|---|---|
| START SERVER | ACTIVITY SYSTEM COMPONENT | SERVER | 2 (MEDIUM) |
| CONFIRM SERVER START | CONFIRMATION SYSTEM COMPONENT | SERVER | 1 (LOW) |
| STOP SERVER | ACTIVITY SYSTEM COMPONENT | SERVER | 2 (MEDIUM) |
| CONFIRM SERVER STOP | CONFIRMATION SYSTEM COMPONENT | SERVER | 1 (LOW) |
| START SERVICE | ACTIVITY SYSTEM COMPONENT | SERVICE | 2 (MEDIUM) |
| CONFIRM SERVICE START | CONFIRMATION SYSTEM COMPONENT | SERVICE | 1 (LOW) |
| STOP SERVICE | ACTIVITY SYSTEM COMPONENT | SERVICE | 2 (MEDIUM) |
| CONFIRM SERVICE STOP | CONFIRMATION SYSTEM COMPONENT | SERVICE | 1 (LOW) |
| SEND MAIL | NOTIFICATION SYSTEM COMPONENT | - | 1 (LOW) |
| INSTALL SOFTWARE | SETTING SYSTEM COMPONENT | SERVICE | 3 (HIGH) |
| ... | ... | ... | ... |

FIG. 25

| INSTANCE NO. | WORKFLOW NO. | COMPONENT NO. (PRESENT) | HOST NAME | SERVICE NAME | USER ID | STARTING METHOD COEFFICIENT | EXCLUSIVITY NO. | ESTIMATED COMPLETION TIMETABLE |
|---|---|---|---|---|---|---|---|---|
| 1 | 1 | 5 | VARIABLE 1 | VARIABLE 2 | USER 2 | 1 | 1 | 20:10 |
| 1 | 1 | 5 | VARIABLE 1 | | USER 2 | 2 | 2 | 20:10 |
| 2 | 1 | 1 | VARIABLE 1 | VARIABLE 2 | USER 2 | 3 | 3 | 20:12 |
| 2 | 1 | 1 | VARIABLE 1 | | USER 2 | 1 | 4 | 20:12 |
| 11 | 2 | 1 | VARIABLE 1 | | USER 1 | 2 | - | 20:15 |
| ... | ... | ... | ... | ... | ... | ... | ... | ... |

FIG. 27

| INSTANCE NO. 66-1 | WORKFLOW NO. 66-2 | EXCLUSIVE SECTION NO. 66-3 | START WAITING TIME 66-4 | START TIMETABLE 66-5 | COMPLETE TIMETABLE 66-6 | ... |
|---|---|---|---|---|---|---|
| 1 | 1 | 1 | 5:00 | 20:10 | | ... |
| 2 | 2 | 4 | 0 | 20:03 | | ... |
| 3 | 3 | 1 | 0 | 30:00 | 20:10 | ... |
| 3 | 3 | 2 | 10:00 | | | ... |
| ... | ... | ... | ... | ... | ... | ... |

| USER ID | USER COEFFICIENT | ... |
|---------|------------------|-----|
| USER 1  | 3                | ... |
| USER 2  | 2                | ... |

FIG. 29

| STARTING METHOD | STARTING METHOD COEFFICIENT | ... |
|---|---|---|
| MANUAL STARTING | 2 | ... |
| SCHEDULED STARTING ACCORDING TO DESIGNATED TIME | 1 | ... |
| STARTING ACCORDING TO NOTIFICATION FROM MONITORING PRODUCT | 3 | ... |

COMPUTER-READABLE RECORDING MEDIUM, EXCLUSION CONTROL APPARATUS, AND EXCLUSION CONTROL METHOD

CROSS-REFERENCE TO RELATED APPLICATION

This application is based upon and claims the benefit of priority of the prior Japanese Patent Application No. 2012-142425, filed on Jun. 25, 2012, the entire contents of which are incorporated herein by reference.

FIELD

The embodiments discussed herein are related to a computer-readable recording medium, an exclusion control apparatus, and an exclusion control method.

BACKGROUND

Business systems are configured by setting up a large number of pieces of IT equipment (servers, storage, networks, and the like) and using operating systems (OS)/middleware/applications that are installed in the IT equipment. A plurality of such business systems may be running. Data centers perform operational tasks, such as monitoring or maintenance, for such business systems.

Equipment for automating operational tasks (for example, runbook automation equipment) creates a workflow describing the operational tasks to be automated. At this point, the operational manager takes into consideration the simultaneous execution of a plurality of workflows, and performs mutual exclusion by adding exclusive sections to the workflows and by performing scheduling that defines the order of the workflows. The following techniques are for automatically managing such workflows.

For example, with computer software applications, there is a method of managing message flows in which messages are processed in parallel using process nodes. Process nodes include at least one set of a lock acquisition node, a system resource access node, and a lock release node, which are mutually connected on a flow path. In such a set, these nodes are mutually connected on a flow path, and each message is processed in an order defined by the flow path. In response to the lock acquisition node having processed each message, the processing for each message in the set is exclusively permitted access to system resources. In response to the processing of the message by a system resource access node of the set, system resource access for the message is granted. Access to resources for the messages includes changes to certain system states. The exclusive access to system resources is released in response to the processing of the message by the lock release node of the set.

Japanese National Publication of International Patent Application Number 2006-511857 is an example of the related art.

SUMMARY

According to an aspect of the invention, a computer-readable recording medium having stored therein a program for causing a computer to execute a digital signature process includes setting, for at least one or more operation information defining operations for an information processing apparatus and being included in a plurality of work flow information that indicate operation procedures, exclusive sections that indicate units of exclusion control performing an exclusive lock, calculating priorities of the exclusive sections using operation importance level information that indicate importance levels of the operations according to types of the operation information and operation urgency level information that indicate an urgency levels of the operations, when the operations are executed based on the operation information corresponding to the exclusive sections of the plurality of workflow information, and executing the exclusion control in the exclusive sections for a plurality of workflow based on the priorities, when a competitive regarding the exclusive lock occurs between the exclusive sections.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates a view for describing a competing relationship of locks for exclusive sections in the cases of FIGS. 5A and 5B and FIG. 6;

FIG. 9 illustrates a view for describing the joining of exclusive sections when, with exclusive sections that are set with different variables, the variables are changed to the same value, according to the present embodiment;

FIG. 10 illustrates a view for describing the dividing of an exclusive section when, with an exclusive section that has been set with the same variable, the contents of the variable are changed in the exclusive section, according to the present embodiment;

FIG. 12 illustrates a first view for describing processing that extracts the exclusive section having the highest execution priority from among the workflows being executed and processing that decides whether to immediately execute the next workflow component or to wait;

FIG. 13 illustrates a second view for describing processing that extracts the exclusive section having the highest execution priority from among the workflows being executed and processing that decides whether to immediately execute the next workflow component or to wait;

FIG. 14 illustrates a third view for describing processing that extracts the exclusive section having the highest execution priority from among the workflows being executed and processing that decides whether to immediately execute the next workflow component or to wait;

FIG. 15 illustrates a fourth view for describing processing that extracts the exclusive section having the highest execution priority from among the workflows being executed and processing that decides whether to immediately execute the next workflow component or to wait;

FIG. 16 illustrates a first view for describing an example of acquisition of an exclusive permission (execution permission) of a workflow when the execution priority is changed during the execution of the workflow;

FIG. 17 illustrates a second view for describing an example of acquisition of an exclusive permission (execution permission) of a workflow when the execution priority is changed during the execution of the workflow;

FIG. 22 illustrates an example of a workflow management table according to an example of the present embodiment;

FIG. 23 illustrates an example of a workflow component definition table in an example of the present embodiment;

FIG. 25 illustrates an example of an instance management table according to an example of the present embodiment;

FIG. 27 illustrates an example of an exclusive information management table according to an example of the present embodiment;

FIG. 28 illustrates an example of a user coefficient table according to an example of the present embodiment;

FIG. 29 illustrates an example of a startup method coefficient table according to an example of the present embodiment;

DESCRIPTION OF EMBODIMENT

Figure 1:
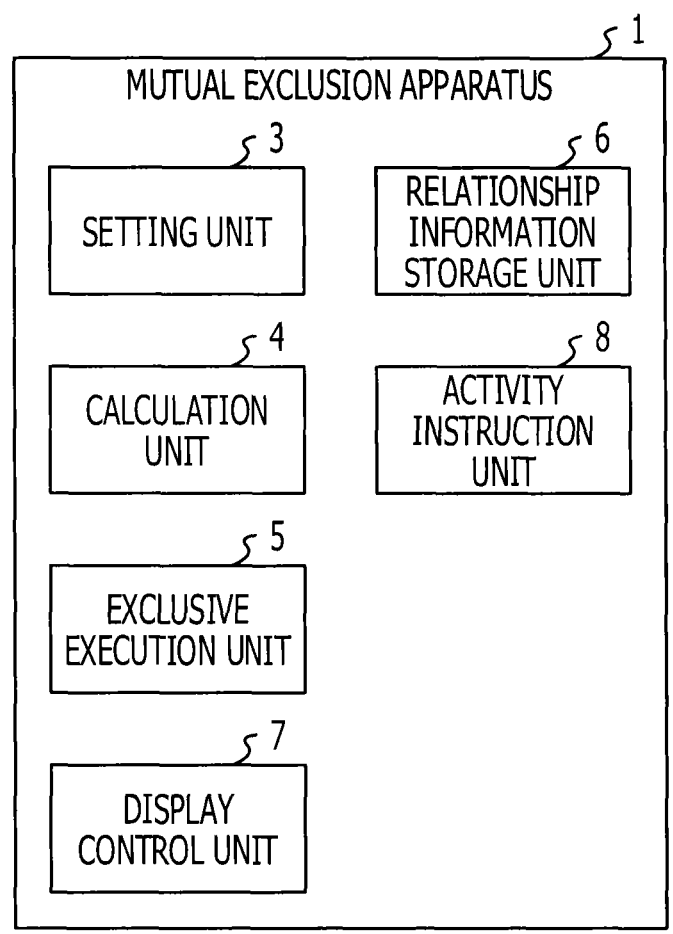
FIG. 1 illustrates a mutual exclusion apparatus according to an aspect of the present embodiment.

According to studies by the inventors, with the above-described techniques, execution of a workflow is accompanied by changes in process target, resources, variables, and the like that are the target of the workflow, and in response to these changes mutual exclusion of the workflow is not performed. Therefore, taking into consideration that the execution of a workflow is accompanied by changes to the process target, resources, variables, and the like that are the target of the workflow, exclusive design of the workflow is executed by hand. However, executing exclusive design so as to cover all the patterns of mutual exclusion is difficult.

Incidentally, since there are a wide variety of operational management tasks in the data center, a large number of workflows may run simultaneously. Even when a large number of workflows may run simultaneously, the integrity of activity (operation) content is desired to be preserved. When a large number of workflows may run simultaneously, the administrator designs and schedules the workflows in consideration of the estimated completion time of the workflow, the integrity of the activity (operation) content, and the integrity of the data.

However, setting of exclusive sections by the administrator during the creation of a workflow is difficult for the following reasons. Here, an exclusive section refers to a given section that executes mutual exclusion in the workflow. When a plurality of workflows are running simultaneously and the simultaneous use of common resources or the like results in a competitive relationship, mutual exclusion refers to prioritizing and running one workflow, setting other workflows to a processing wait state, and avoiding competition.

An example of a first reason is that the design load of the exclusive sections is considerable. The administrator is asked to fully consider the simultaneous execution properties of the workflows that are to be run on demand. Therefore, the design of exclusive sections involves a great deal of time and effort. In addition, since the activity (operation) target and the resources to be used when the workflow is run are determined many times, designing exclusive sections so as to cover all the patterns is difficult. In addition, since the exclusive sections are designed by human beings, there may be oversights in the setting of mutual exclusion, and mutual exclusion mistakes such as deadlock may easily occur. In addition, when a workflow is added, in addition to reviewing the exclusive sections for all the workflows, the exclusive sections may be desired to be redesigned.

An example of a second reason is that it is not possible to acquire the latest information. For example, after workflow A acquires information of server A, when workflow B handles server A, the information of workflow A becomes out of date. Since the information is desired to be re-acquired in order for the workflow A to obtain the latest information about the server A, the efficiency is poor.

An example of a third reason is that the overall efficiency of the operational tasks is decreased due to the design of the exclusive section during workflow creation. With the design of exclusive sections by human beings, it is considered that unnecessary exclusive sections may be set in the workflows. As a result, there is a risk that operational tasks may be delayed. That is, since certain workflows perform exclusive acquisition regardless of the execution status of other workflows, it is not possible to change the order of the exclusive acquisition according to the status, and the overall efficiency of operational tasks is decreased. Here, when a plurality of workflows are running simultaneously and the simultaneous use of common resources or the like results in a competitive relationship, exclusive acquisition refers to the act of prioritizing and running one workflow. In such a case, the other workflows enter a processing wait state until the given task of the workflow that is running is completed.

An example of a fourth reason is that the range of influence when an error occurs with mutual exclusion is great. When an error with mutual exclusion occurs, because a great deal of related work (that is, processes) stops and restoration support is called for, the influence is wide ranging.

Thus, in the present embodiment, appropriate exclusive sections are dynamically determined according to each workflow's starting status and progress status during the execution of workflows.

FIG. 1 illustrates a mutual exclusion apparatus in an aspect of the present embodiment. A mutual exclusion apparatus 1 includes a setting unit 3, a calculation unit 4, and an exclusive execution unit 5.

The setting unit 3 sets exclusive sections indicating units of mutual exclusion that perform an exclusive lock, with respect to at least one or more items of activity (operation) information out of each of a plurality of items of workflow information which indicate a activity (operation) procedure that includes activity information defining an activity (operation) with respect to an information processing apparatus. An example of the setting unit 3 includes a setting unit 14.

When an activity is executed based on activity information corresponding to the exclusive sections of each item of workflow information, the calculation unit 4 calculates the priority of the exclusive sections using activity importance level information that indicates an importance level of the activity according to the classification of the activity information and activity urgency level information that indicates an urgency level of the activity. An example of the calculation unit 4 includes the setting unit 14.

When there is a competitive relationship for an exclusive lock between exclusive sections, the exclusive execution unit 5 performs mutual exclusion of the exclusive sections during the workflow based on priority. An example of the exclusive execution unit 5 includes the setting unit 14.

With the above configuration, it is possible to dynamically determine exclusive sections that indicate units of mutual exclusion which perform an exclusive lock.

The setting unit 3 sets an exclusive section for at least one or more items of activity information in response to variables transferred between activity targets of the activity information, the activity targets and the input information for the activity targets, or the items of activity information. For example, the setting unit 3 groups activity information in the following cases. That is, when the activity targets are the same among successive items of activity information for each item of workflow information, when the activity targets and input information for the activity targets are the same, or when a variable output by an item of the activity information among the items of activity information is input information for other activity information. The setting unit 3 sets exclusive sections with respect to the grouped activity information. With the above configuration, it is possible to determine exclusive sections.

In addition, the setting unit 3 merges exclusive sections when the value of a variable used in the activity included in the exclusive sections is the same for successive exclusive sections. The setting unit 3 may divide an exclusive section when the value of variable used in the exclusive section is changed due to an activity included in the exclusive section.

The mutual exclusion apparatus 1 further includes a relationship information storage unit 6. The relationship information storage unit 6 stores an activity importance level, a first value, a second value, and a third value. The activity importance level is information corresponding to the activity information included in each acquired workflow. The first value is a value weighted according to the user starting the workflow. The second value is a value weighted according to the cause of the start of the workflow. The third value is a value weighted according to time remaining until completion of the workflow. An example of the relationship information storage unit 6 includes a storage unit 17, and a database (DB) 51.

The calculation unit 4 acquires the activity importance level for the activity information included in each workflow from the relationship information storage unit 6. The calculation unit 4 adds the activity importance level to every exclusive section. The calculation unit 4 acquires from the relationship information storage unit the first value corresponding to the user starting the workflow, the second value corresponding to the cause of the start of the workflow, and the third value corresponding to the time remaining until completion of the workflow. The calculation unit 4 calculates the activity urgency level by multiplying the first value, the second value, and the third value. The calculation unit 4 calculates the priority by multiplying the activity importance level added to every exclusive section and the activity urgency level.

With the above configuration, it is possible to calculate the priority.

The exclusive execution unit 5 notifies an activity instruction unit 8 that the workflow for the workflow information having the exclusive section with the highest priority is to be executed. The activity instruction unit 8 gives activity instructions to the information processing apparatus. An example of the activity instruction unit 8 includes a workflow execution unit 16.

With the above configuration, it is possible to perform mutual exclusion by running a workflow that has acquired the exclusive permission and not running a workflow that did not acquire exclusive permission.

The mutual exclusion apparatus 1 further includes a display control unit 7. The display control unit 7 outputs information indicating both exclusive sections that have been exclusively controlled as well as exclusive sections that are to be exclusively controlled, based on the mutual exclusion. An example of the display control unit 7 includes a display control unit 15.

With the above configuration, it is possible to display mutual exclusion based on predictions and a record of mutual exclusion that has been performed.

Figure 2:
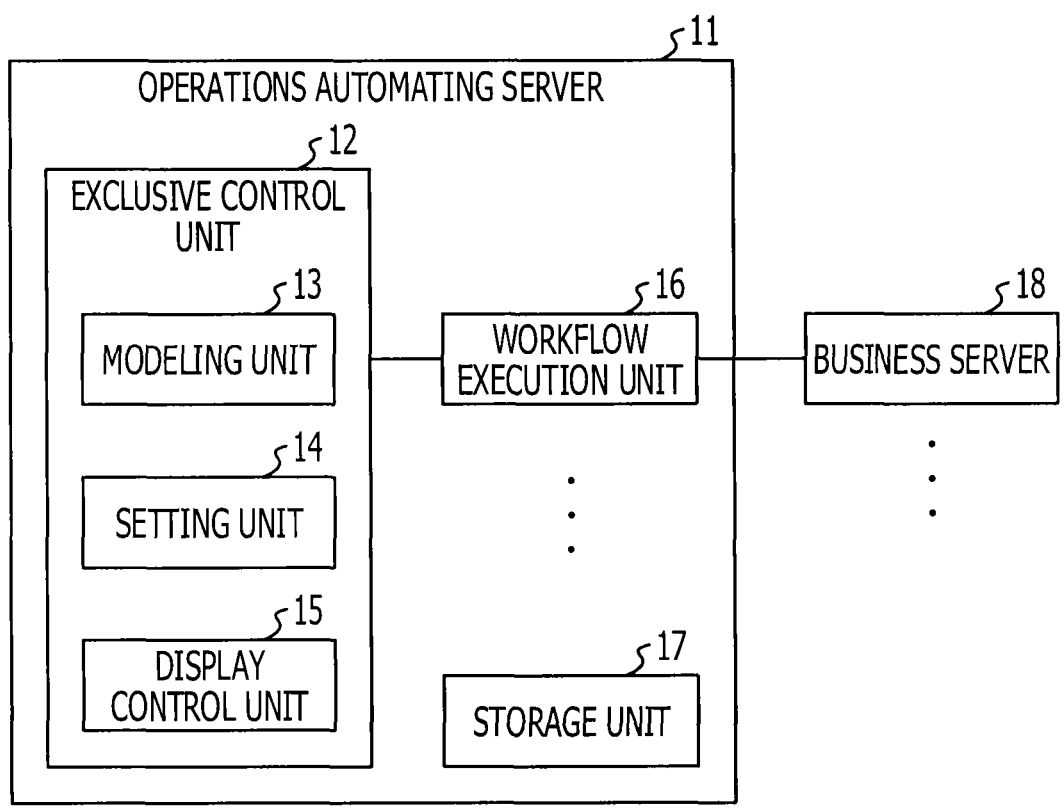
FIG. 2 illustrates an example of an operational system according to the present embodiment.

FIG. 2 illustrates an example of an operational system in the present embodiment. The operational system includes operations automating server 11 and a business server 18. The business server 18 performs a variety of business processes. The operations automating server 11 automates and manages the running of the business server 18.

The operations automating server 11 includes a mutual exclusion unit 12, the workflow execution unit 16, and the storage unit 17. The workflow execution unit 16 executes workflows based on control according to the mutual exclusion unit 12. The storage unit 17 stores data relating to the workflows, table information to be described later, and the like.

The mutual exclusion unit 12 dynamically determines exclusive sections, controls the process order according to the activity priority predicted in the future, and controls the display of the execution history of the workflows. The mutual exclusion unit 12 includes a modeling unit 13, the setting unit 14, and the display control unit 15.

Dynamic Determination of Exclusive Sections

The mutual exclusion unit 12 provisionally determines the exclusive sections from the type of each workflow component during the start of the running of a workflow and the resources being used (activity target and variables). With the provisionally determined exclusive sections as a reference and while the workflow is running, the mutual exclusion unit 12 considers the execution status and exclusive status of other workflows to dynamically determines exclusive sections. Here, a workflow component is, for example, a script describing the automatic execution of an operational activity on the business server 18 so that each process making up the workflow is automatically executed by the business server 18.

Control of Process Order According to Future Predicted Activity Priority

When acquiring exclusivity, the mutual exclusion unit 12 performs mutual exclusion based on predictions by considering exclusivity acquisition schedule information and execution priority of other workflows that have acquired exclusivity and other workflows that haven't acquired exclusivity. Accordingly, the mutual exclusion unit 12 appropriately changes the order of the tasks of the workflow.

Displaying Execution History of Workflow

The mutual exclusion unit 12 (display control unit 15) records the dynamically determined exclusive section and the mutual exclusion state for exclusivity (acquired exclusivity and waiting time) in a storage device and displays the recorded data on a display apparatus. Accordingly, the user may easily confirm the execution status for exclusivity.

Figure 3:
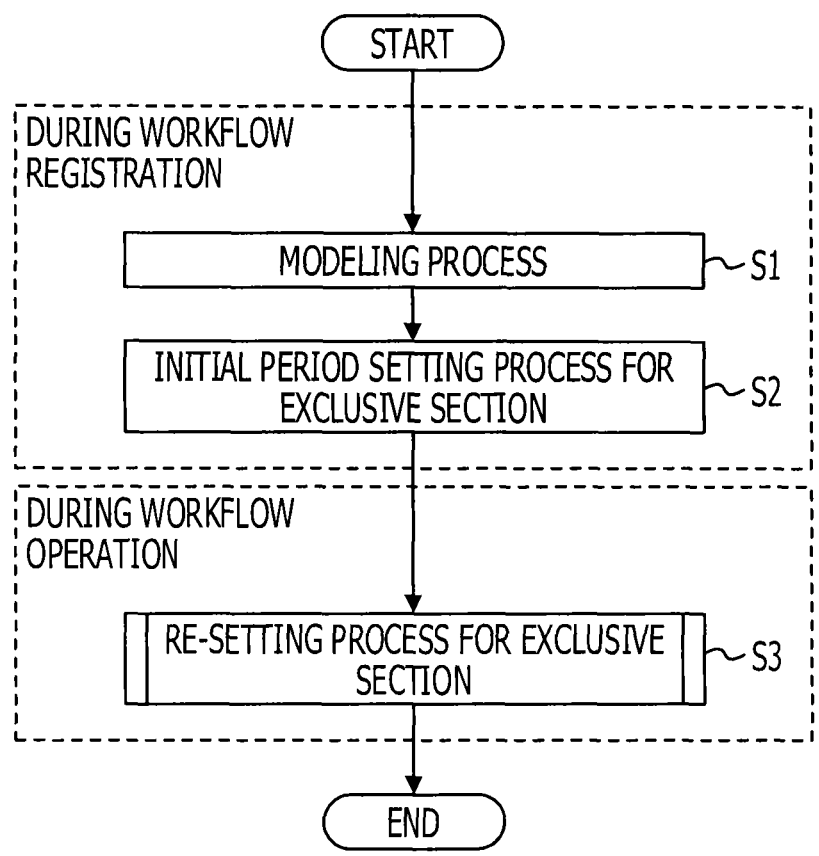
FIG. 3 illustrates an entire process flow according to the present embodiment.

FIG. 3 illustrates an overall process flow of the present embodiment. During registration of a workflow in the operations automating server 11, the mutual exclusion unit 12 performs a modeling process (S1) and an initialization process for the exclusive sections (S2). When the workflow is running, the mutual exclusion unit 12 performs an exclusive section re-setting process (S3). In the following, description will be given of the process when registering the workflow and the process when the process is running.

Process During Workflow Registration

When registering a workflow in the operations automating server 11, the modeling unit 13 and the setting unit 14 execute the following processes.

In the modeling process (S1), the following processes are performed. The modeling unit 13 separates the workflow components into groups and defines the activity importance level (S1), based on the content of the workflow components for the registered workflows. For example, the modeling unit 13 sets the activity importance level to "High" (or "1") for workflow components that have a configuration nature and perform actions such configuring a network or registering information to a business system. In addition, the modeling unit 13 sets the activity importance level to "Medium" (or "2") for workflow components that have a configuration nature and involve actions such as restarting an OS or starting a service, for example. In addition, the modeling unit 13 sets the activity importance level to "Low" for workflow components that have a reference, confirmation, or notification nature, such as confirming the state of a server or service, for example. Accordingly, it is possible to model the workflow components defined in the workflow, as illustrated in FIG. 3 and FIG. 4. According to the modeled workflow, the activity importance level of each workflow component is determined.

Figure 4A:
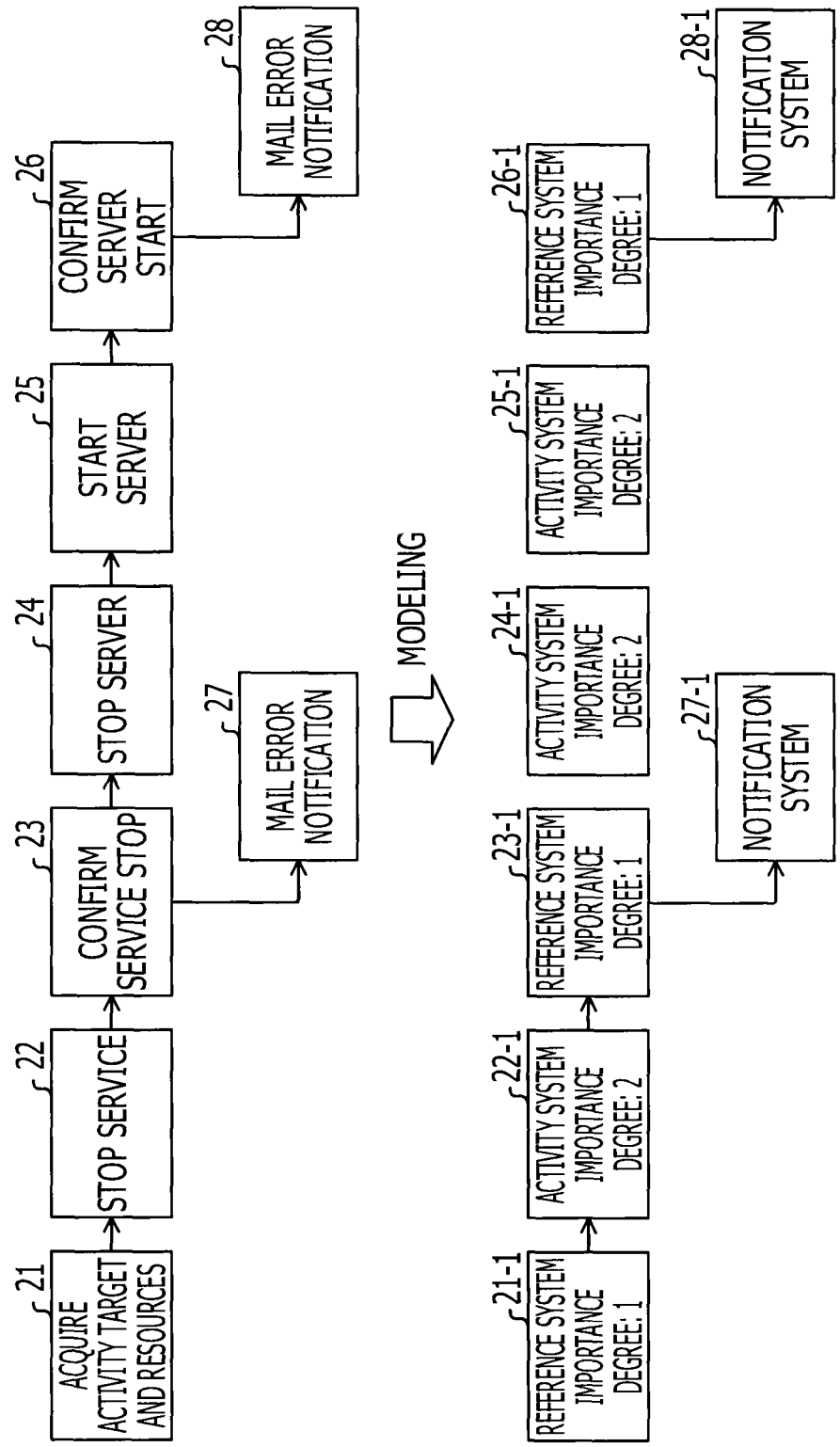
FIGS. 4A and 4B illustrate views for describing the modeling of workflow components defined in the workflow according to the present embodiment.
Figure 4B:
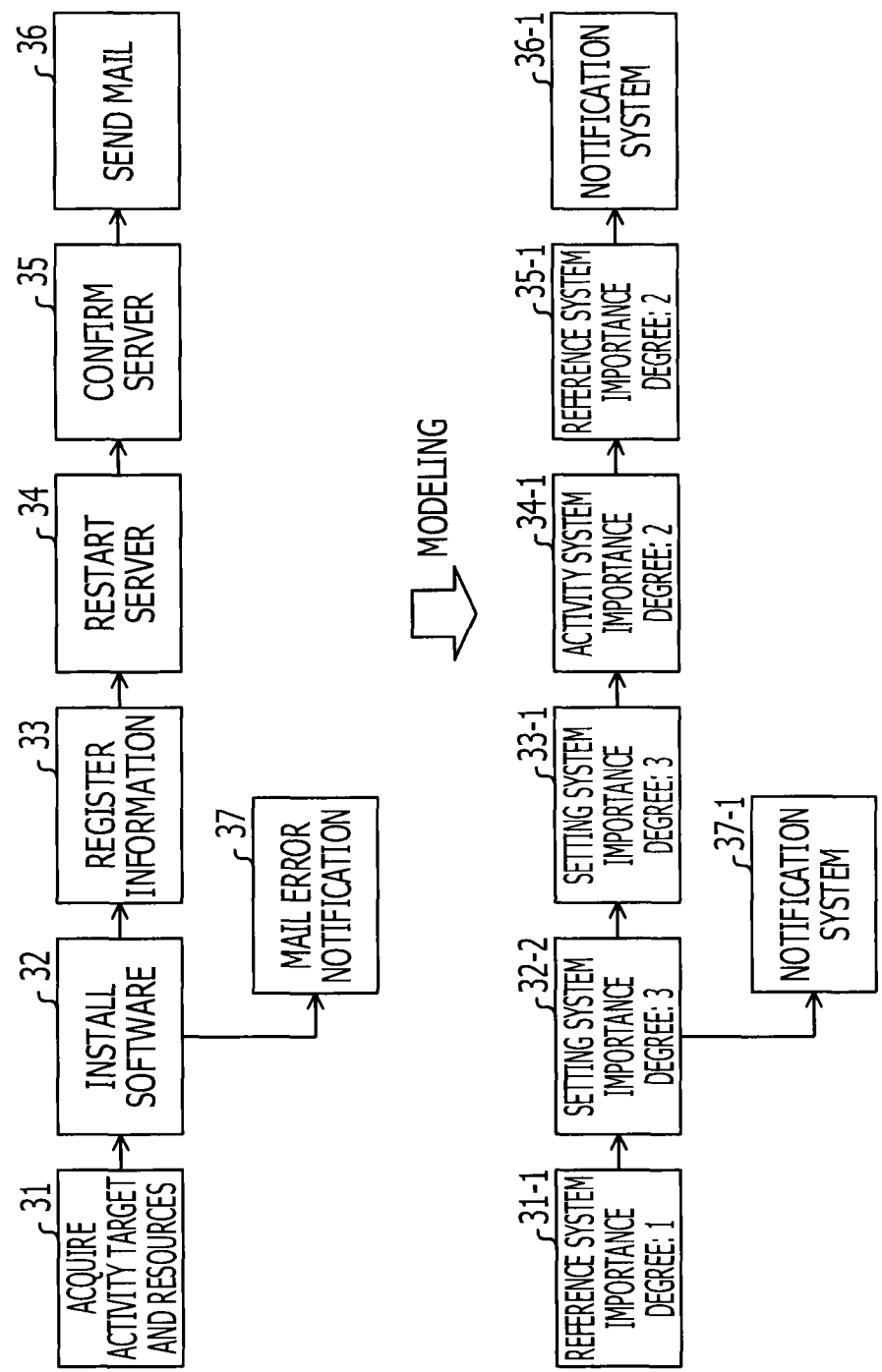

FIGS. 4A and 4B are views for describing the modeling of workflow components defined in the workflow in the present embodiment. For example, in the workflow A illustrated in FIG. 4A, the following workflow components are defined: "acquire activity target and resources" 21, "stop service" 22, "confirm service stop" 23, "stop server" 24, "start server" 25, "confirm server start" 26, and "mail error notification" 27 and 28. For example, in the workflow B, the following workflow components are defined: "acquire activity target and resources" 31, "install software" 32, "register information" 33, "restart server" 34, "confirm server start" 35, "send mail" 36, and "mail error notification" 37.

When the workflow A is modeled by the modeling unit 13, the "acquire activity target and resources" 21 is modeled with "reference type" 21-1, and the importance level is set to 1. The "stop service" 22 is modeled with "activity type" 22-1, and the importance level is set to 2. The "confirmation of stopping of service" 23 is modeled with "reference type" 23-1, and the importance level is set to 1. The "stop server" 24 is modeled with "activity type" 24-1, and the importance level is set to 2. The "start server" 25 is modeled with "activity type" 25-1, and the importance level is set to 2. The "confirmation server start" 26 is modeled with "reference type" 26-1, and the importance level is set to 1. The "mail error notification" 27 and 28 are modeled with notification types 27-1 and 28-1.

When the workflow B is modeled by the modeling unit 13 as illustrated in FIG. 4B, the "acquire activity target and resources" 31 is modeled with "reference system" 31-1, and the importance level is set to 1. The "install software" 32 is modeled with "reference system" 32-1, and the importance level is set to 3. The "register information" 33 is modeled with "setting system" 33-1, and the importance level is set to 3. The "restart server" 34 is modeled with "activity system" 34-1, and the importance level is set to 2. The "confirm server start" 35 is modeled with "reference system" 35-1, and the importance level is set to 1. The "send mail" 36 and the "mail error notification" 37 are modeled with "notification systems" 36-1 and 37-1.

Figure 5A:
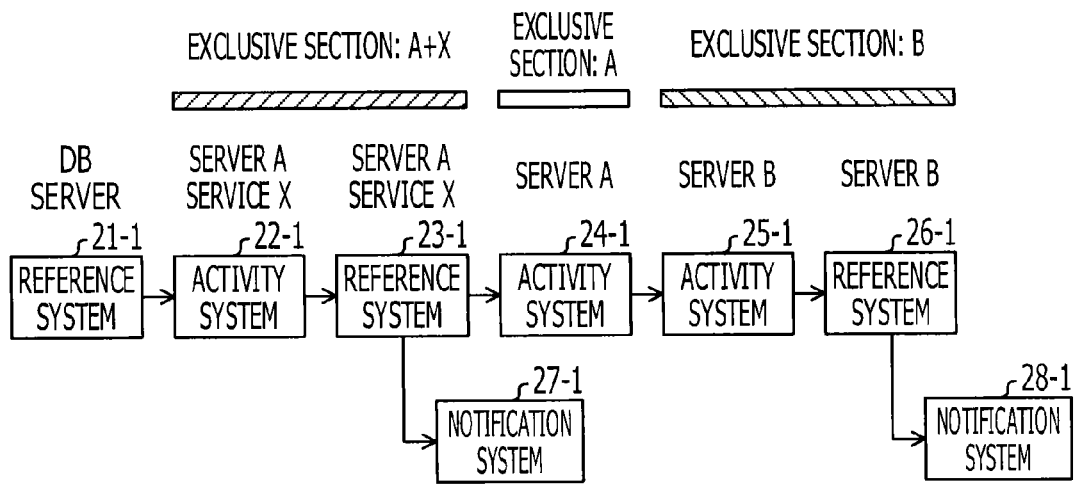
FIGS. 5A and 5B illustrate views for describing processing that determines exclusive sections based on the same activity (operation) target or usage of the same variable, according to the present embodiment.
Figure 5B:
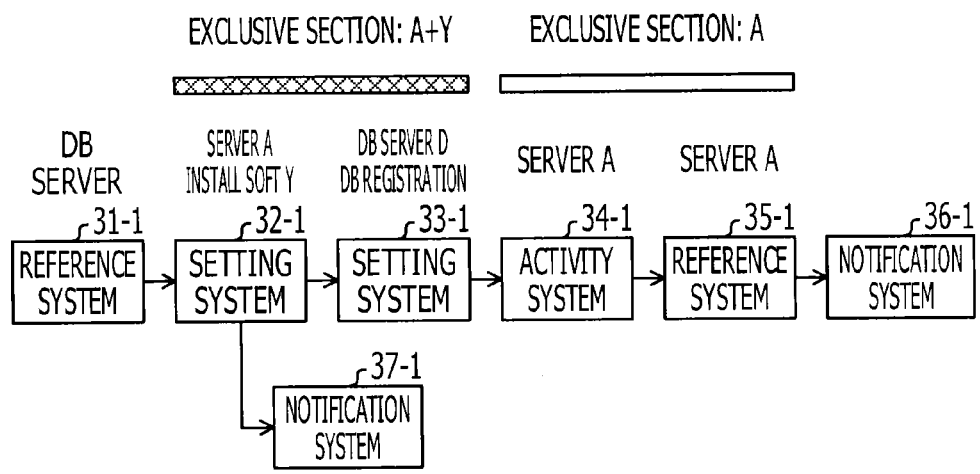
Figure 6:
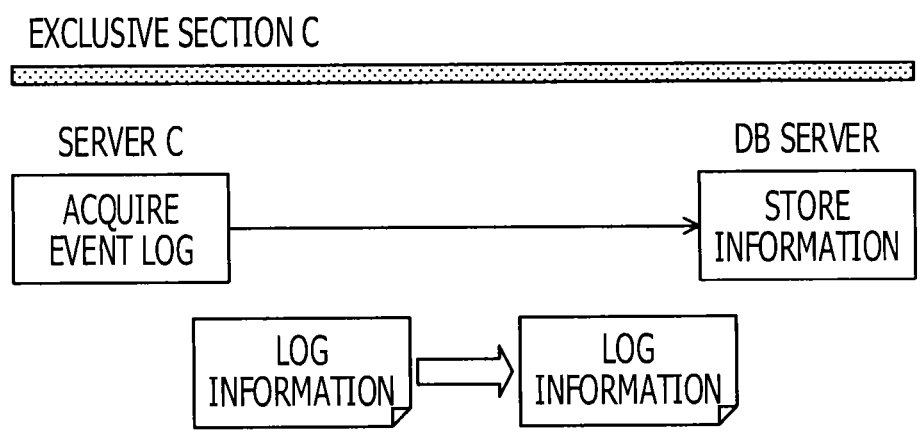
FIG. 6 illustrates a view for describing a process that determines exclusive sections based on the flow of resources (that is, the transfer of variables) to be used in each workflow component, according to the present embodiment.

Next, in the initial setting process of the exclusive sections (S2), the following processes are performed. As illustrated in FIGS. 5A and 5B and FIG. 6, the setting unit 14 automatically determines the exclusive sections based on (i) the use of the same activity target/the same variable, and (ii) the flow (transfer of the variables) of resources used by each workflow component. For example, with regard to successive workflow components, the setting unit 14 determines the exclusive sections based on whether the activity target servers are the same, or whether the activity target server and the activity content (service, software to be installed) are the same. Here, the "A" of "exclusive section A" is defined as the "exclusive section name".

For example, the section for which the activity target is server A is defined as "exclusive section: A". The section for which the activity target is server B is defined as "exclusive section: B". In addition, in "exclusive section: A", the section for the activity with respect to Service X is defined as "exclusive section: A+X". In addition, in "exclusive section: A", the section for the activity with respect to Installed Software Y is defined as "exclusive section: A+Y". In addition, the section in which the output information of the workflow components becomes the input of the subsequent workflow component is set to "exclusive section: C".

FIGS. 5A and 5B illustrate views for describing processes determining exclusive sections based on the same activity target or use of the same variable in the present embodiment. In FIG. 5A, with regard to workflow components 22-1 and 23-1, the activity target server is the same as "server A" and the service is also the same as "service X". In this case, the setting unit 14 determines "exclusive section: A+X" for workflow components 22-1 and 23-1.

For workflow component 24-1, the activity target server is the server A. In this case, the setting unit 14 determines "exclusive section: A" for workflow component 24-1.

For workflow components 25-1 and 25-6, the activity target server is server B. In this case, the setting unit 14 determines "exclusive section: B" for workflow components 25-1 and 25-6.

FIG. 6 illustrates a view for describing a process that determines exclusive sections based on the flow (transfer of variables) of resources to be used in each workflow component in the present embodiment. The setting unit 14 selects the range of mutual exclusion based on whether the output value of the workflow component is the input value of the subsequent workflow component.

As illustrated in FIG. 6, when an event log (log information) acquired from the server C is stored in the database (DB) server, the setting unit 14 defines "exclusive section: C" with regard to that section.

A competitive relationship over a lock in each exclusive section refers to cases where the exclusive section name is any of the following.

The exclusive section name that is to acquire exclusivity partially matches an exclusive section name that has acquired exclusivity.

The exclusive section name that has acquired exclusivity partially matches an exclusive section name that is to acquire exclusivity. Accordingly, the setting unit 14 determines whether the exclusive section name that is to acquire exclusivity partially matches an exclusive section name that has acquired exclusivity or whether the exclusive section name that has acquired exclusivity partially matches an exclusive section name that is to acquire exclusivity. When it is determined that an exclusive section name that is to acquire exclusivity partially matches an exclusive section name that has acquired exclusivity, the setting unit 14 determines that the exclusive lock is in a competitive relationship. In addition, when it is determined that an exclusive section name that has acquired exclusivity partially matches an exclusive section name that is to acquire exclusivity, the setting unit 14 determines that the exclusive lock is in a competitive relationship.

FIG. 7 is a view for describing a competing relationship for locks for exclusive sections in the cases of FIGS. 5A and 5B and FIG. 6. For example, when the exclusive section that has acquired exclusivity is "exclusive section: A", and when the exclusive section that is to acquire exclusivity is "exclusive section: A", "exclusive section: A+X", or "exclusive section: A+Y", the exclusive lock is in a competitive relationship. Conversely, when the exclusive section that has acquired exclusivity is "exclusive section: A", and when the exclusive section that is to acquire exclusivity is "exclusive section: B", or "exclusive section: C", the exclusive lock is not in a competitive relationship.

Process when Workflow is Running

Next, description will be given of a process when a workflow is running.

Figure 8:
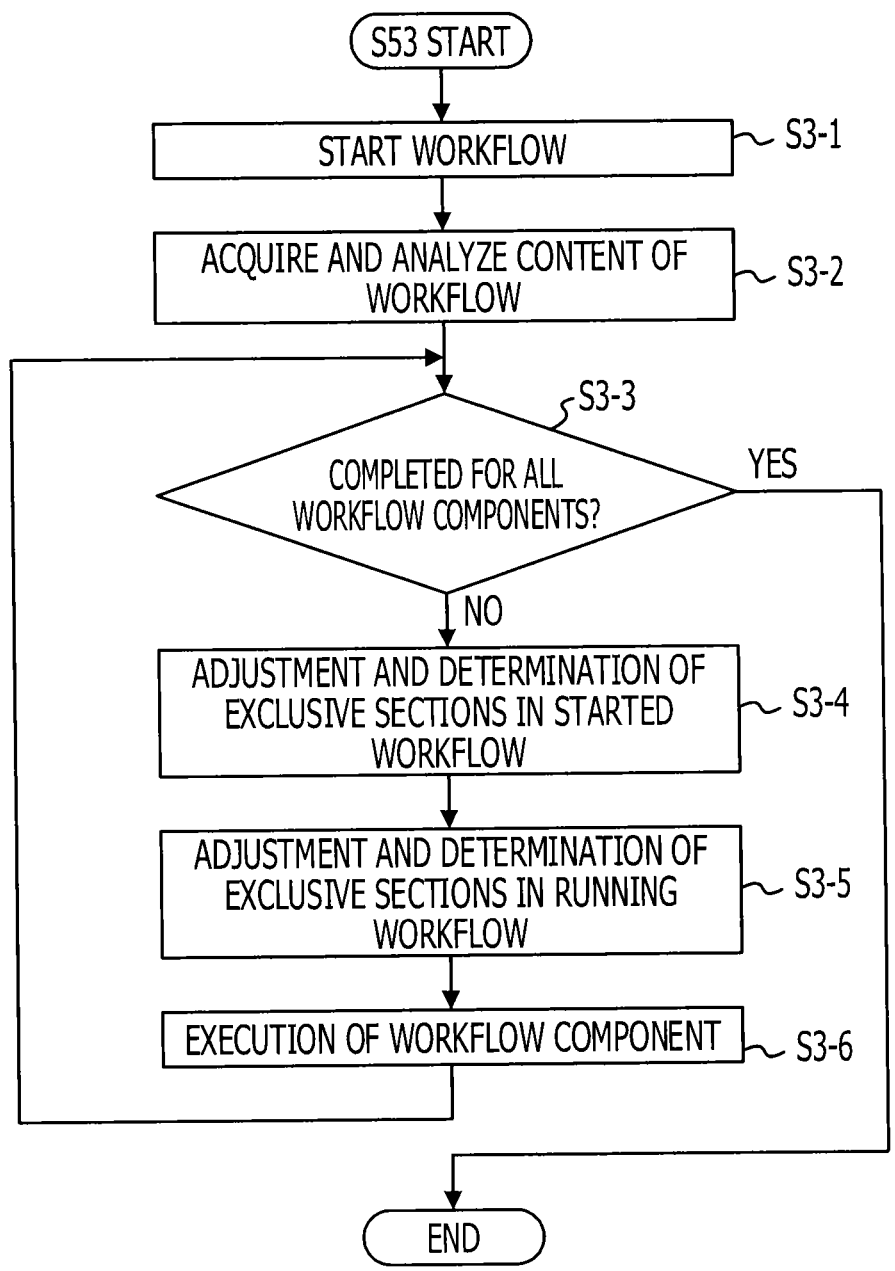
FIG. 8 illustrates an example of a flowchart performing a process (S3) when the workflow is running according to the present embodiment.

FIG. 8 is an example of a flowchart performing a process (S3) when a workflow is running in the present embodiment. FIG. 8 illustrates in detail the S3 of FIG. 2. When the workflow is started (S3-1), the mutual exclusion unit 12 acquires and analyzes the content of the workflow (S3-2). When a workflow component in the started workflow is executed ("No" in S3-3), the mutual exclusion unit 12 performs determination for and adjustment of the exclusive sections in the started workflow (S3-4). Then, with a running workflow, the mutual exclusion unit 12 performs determination for and adjustment of the exclusive sections (S3-5). The workflow execution unit 16 instructs the business server 18 to execute the workflow component based on the results of the adjustment and determination (S3-6). The processes of S3-4 to S3-6 are performed for all workflow components.

In relation to S3-2, S3-4, and S3-5 of FIG. 8, details are illustrated below.

(1) Details of the Acquisition and Analysis of Content of Workflow

During the startup of the workflow, the mutual exclusion unit 12 determines the execution priority by performing the following process. First, the mutual exclusion unit 12 acquires information about the workflow components defined in the workflow as well as the resources to be used, which are registered in a storage device 77 of the operations automating server 11 in advance. Next, the mutual exclusion unit 12 again implements S2 of FIG. 2 and re-sets the exclusive section of the next case, based on the information (information regarding the activity target/content of the variables) about the resources to be used by each workflow component. That is, when, in exclusive sections in which different variables are input, the variables are changed to the same values, the mutual exclusion unit 12 joins the exclusive sections. In addition, when, in exclusive sections set using the same variables, the content of the variables is changed, the mutual exclusion unit 12 divides the exclusive sections.

FIG. 9 is a view for describing the joining of exclusive sections when the variables are changed to the same value in exclusive sections that were set using different values in the present embodiment. In the exclusive sections before joining, the workflow components 22-1 to 24-1 are set to "exclusive section: A" and the workflow components 25-1 to 26-1 are set to "exclusive section: B".

Thereafter, the workflow is executed, and there is a change to the values of the variables. The value of variable A set in the workflow components 22-1 to 24-1 is "Server A". The value of variable B set in the workflow components 25-1 to 26-1 is "Server B". In this case, in the adjacent "exclusive section: A" and the "exclusive section: B", since the value of the variable A and the value of the variable B are the same, the "exclusive section: A" and the "exclusive section: B" are joined and set to "exclusive section: A".

FIG. 10 is a view for describing the dividing of an exclusive section when the contents of variables are changed in an exclusive section set that uses the same variables in the present embodiment. In the exclusive section before dividing, the workflow components 22-1 to 26-1 are set to "exclusive section: A".

Thereafter, the workflow is executed, and there is a change to the value of the variable. The value of the variable A set in the workflow components 22-1 to 23-1 is "Server A". The value of the variable A set in the workflow components 24-1 to 26-1 is "Server B". In this case, for the workflow components 22-1 to 23-1 and the workflow components 24-1 to 26-1, since the values of the variable A are different, the "exclusive section: A" is divided, and the "exclusive section: A" and "exclusive section: B" are formed.

Next, the mutual exclusion unit 12 follows the following formula (1) and determines the activity urgency level in response to the user starting the workflow, the method of starting the workflow and the time remaining until the estimated completion time.

$$\text{Activity urgency level} = \text{user coefficient} \times \text{starting method coefficient} \times \text{time coefficient} \quad (1)$$

The user coefficient is the user coefficient of the user starting the workflow. As an example of the user coefficient, for instance, for a manager user, the user coefficient is set to 3.0. For a general user, the user coefficient is set to 2.0.

As the starting method coefficient, for example, when the starting of the workflow is manual starting, the starting method coefficient is set to 2.0. When the starting of the workflow is scheduled starting according to a designated time, the starting method coefficient is set to 1.0. When the starting of the workflow is starting according to notification from a monitoring product, the starting method coefficient is set to 3.0.

As the time coefficient, for example, when the remaining amount of time until the estimated completion time is 10 minutes or less, the time coefficient is set to 2.0. When the remaining amount of time until the estimated completion time is less than or equal to 20 minutes and greater than 10 minutes, the time coefficient is set to 1.5. Otherwise, when there is no designated estimated completion time, the time coefficient is set to 1.0.

Next, the mutual exclusion unit 12 follows the following formula (2) and provisionally determines the execution priority of the workflow.

$$\text{Execution priority} = \Sigma \text{activity importance level} \times \text{activity urgency level} \quad (2)$$

Figure 11:
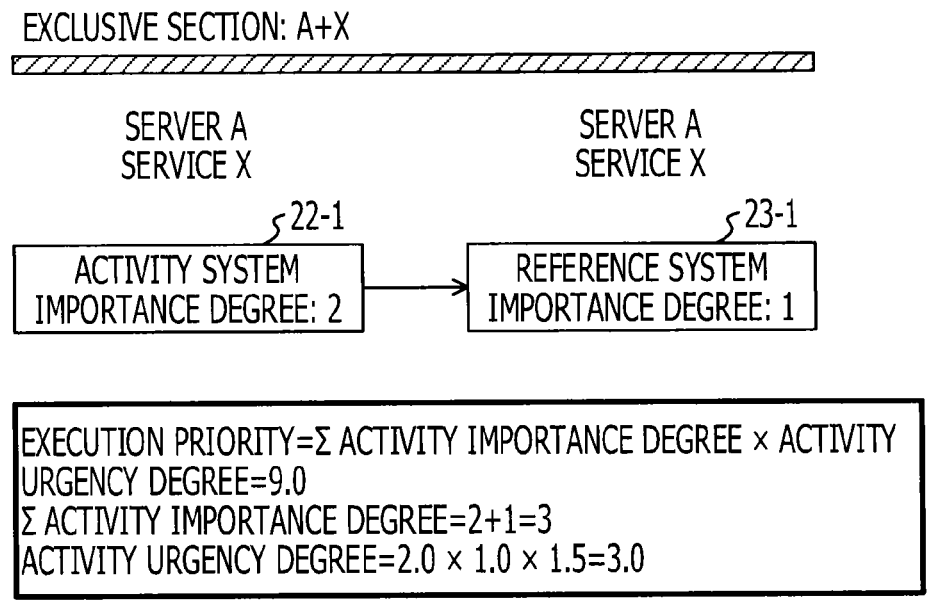
FIG. 11 illustrates a view for describing the provisional determination of execution priority for a workflow, according to the present embodiment.

FIG. 11 is a view for describing the provisional determination of the execution priority of a workflow in the present embodiment. For workflow A, for example, it is assumed that user coefficient: 2.0, starting method coefficient: 1.0, and time coefficient: 1.5 are set. Since the activity importance level of the workflow component 22-1 is "2", and the activity importance level of the workflow component 23-1 is "1", Σ activity importance level=2+1=3. From the formula (1), it is calculated that the activity urgency level=2.0×1.0×1.5=3.0. Thus, from the formula (2), the execution priority becomes 3.0×3.0=9.0.

(2) Adjustment and Determination of Exclusive Sections of Workflow Provisionally Determined when Workflow is Running Next, the mutual exclusion unit 12 performs adjustment and determination for the exclusive sections of the workflow provisionally determined when the workflow is running. When the workflow is run, the mutual exclusion unit 12 changes the execution priority according to the branching of the workflows and the processing results of the workflow components. In addition, according to the execution priority, the mutual exclusion unit 12 determines whether to immediately execute the next workflow component of the workflow components being executed or to wait. These processes are executed according to the following procedures (I) to (V).

(I) The mutual exclusion unit 12 receives given notification from the workflow execution unit 16.

(II) The mutual exclusion unit 12 carries out the previously described processes of "(1) Details of Acquisition and Analysis of Content of Workflow", and re-determines the exclusive sections and the execution priority.

(III) The mutual exclusion unit 12 stores the exclusive section and the execution priority re-determined in the above-described (II) in the storage device 77.

(IV) The mutual exclusion unit 12 extracts the exclusive sections having the highest execution priority among the workflows being executed.

(V) The mutual exclusion unit 12 decides whether to immediately execute the next workflow component or to wait. Here, when the exclusive acquisition of the workflow which is the target is decided, the mutual exclusion unit 12 executes the workflow component. When the exclusive acquisition of another workflow is the priority, the mutual exclusion unit 12 delays the execution task.

For the above-described processes of (IV) and (V), description will be given using FIGS. 12 to 17.

FIGS. 12 to 15 are views for describing extraction processing of the exclusive section having the highest execution priority among the workflows being executed and processing deciding whether to immediately execute the next workflow component or to wait. In FIGS. 12 to 15, description will be given of a situation where the workflows A, B, and C are executed in parallel. In each workflow in FIGS. 12 to 15, the downward facing triangle mark indicates the present processing position. In addition, while the exclusive permission (execution permission) to be described later is being acquired, the workflow may execute the processing.

In FIG. 12, since, when processing is attempted for "exclusive section: A+X" of workflow A, the execution priority of "exclusive section: A+X" of workflow C is high, workflow A enters a state of waiting until the exclusivity of workflow C is released (S11).

Since the "exclusive section: A+Y" of workflow B is not in a competitive relationship with "exclusive section: A+X", workflow B acquires exclusive permission (execution permission) (S12).

For the "exclusive section: A+X" of workflow C, since the execution priority is the highest among the exclusive sections of workflows A, B, and C at this point in time, the workflow C acquires exclusive permission (execution permission) (S13).

As illustrated in FIG. 13, when the processing of "exclusive section: A+X" of workflow C is completed, the exclusive state of "exclusive section: A+X" is released. As a result, since the "exclusive section: A+X" of workflow A has the highest priority, workflow A acquires exclusive permission (execution permission) (S14).

Regarding "exclusive section: A" of workflow C, the workflow C enters a waiting state (S15) until the exclusive state for "exclusive section: A+X" of workflow A is released.

As illustrated in FIG. 14, when the processing of the "exclusive section: A+X" of workflow A is completed, the exclusive state of "exclusive section: A+X" is released. Next, in the "exclusive section: A" of workflows B and C, when the execution priorities are the same, the workflow C is prioritized and acquires exclusive permission (execution permission) due to the authority of the manager (that is, by having the greatest user coefficient) (S16).

Regarding "exclusive section: A" of workflows A and B, the workflows A and B enter a waiting state (S17) until the exclusive state for "exclusive section: A" of workflow C is released.

As illustrated in FIG. 15, when the processing of "exclusive section: A" of workflow C is completed, the exclusive state of "exclusive section: A" is released. As a result, since the "exclusive section: A" of workflow B has the highest execution priority, workflow B acquires exclusive permission (execution permission) (S18).

Regarding "exclusive section: A" of workflow A, the workflow A enters a waiting state (S19) until the exclusive state of "exclusive section: A" of workflow B is released.

Next, description will be given of an example of acquisition of exclusive permission (execution permission) for a workflow when the execution priority is changed during the execution of the workflow.

FIG. 16 and FIG. 17 are views for describing an example of acquisition of exclusive permission (execution permission) for a workflow when the execution priority is changed during the execution of the workflow.

As illustrated in FIG. 16, regarding the "exclusive section: A" of workflow A, when the workflow A acquires exclusive permission (execution permission), the workflow B has not yet acquired exclusive permission (execution permission) for the "exclusive section: A"; however, the execution priority of the workflow B is the highest. For this reason, regarding the "exclusive section: A" for workflow A, after acquisition of exclusive permission (execution permission) by the workflow B for the "exclusive section: A" of workflow B, workflow A enters a waiting state (S21) until the exclusive state is released.

As illustrated in FIG. 17, the time coefficient changes with the passing of time. As a result, the execution priority of the "exclusive section: A" of workflow A changes (S22). In so doing, since the execution priority of the "exclusive section: A" of workflow A becomes the highest, the workflow A acquires the exclusive permission (execution permission) and executes processing (S23).

Display of Execution History of Workflow

Figure 18:
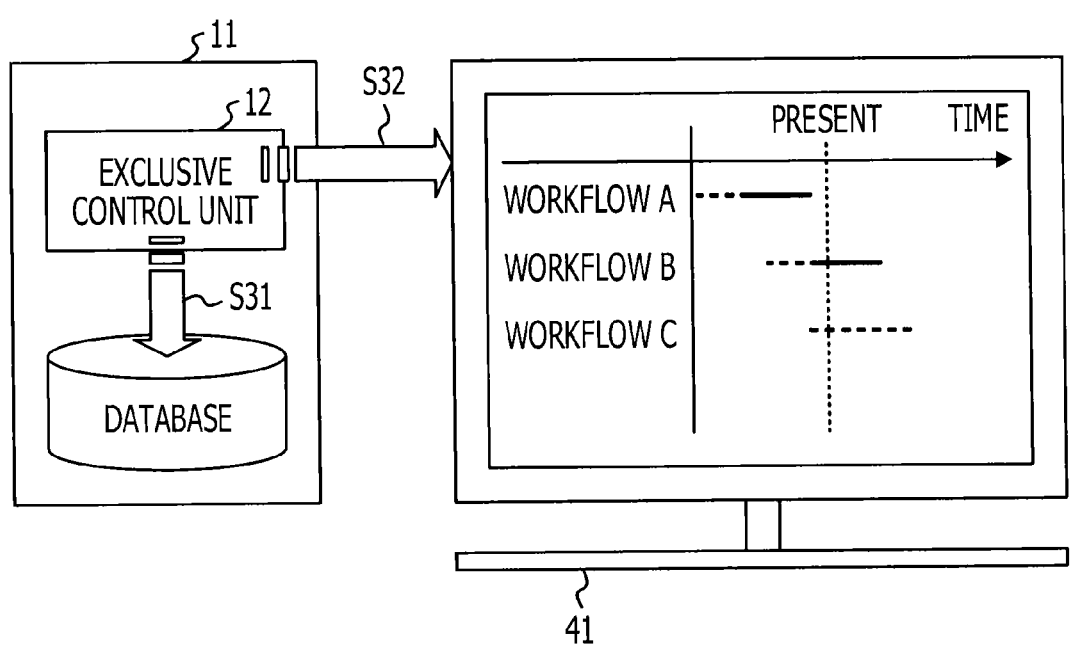
FIG. 18 illustrates a view for describing the display of the execution history of the workflow, according to the present embodiment.

FIG. 18 is a view for describing the display of the execution history of the workflow in the present embodiment. The mutual exclusion unit 12 records the dynamically determined exclusive section and the mutual exclusion state (acquired exclusive permission (execution permission) and waiting time) in a database (S31).

The mutual exclusion unit 12 provides notification of the recorded exclusive section and the mutual exclusion state to a terminal apparatus 41 such as a personal computer (S32). Accordingly, the user may easily confirm the exclusive execution status via the terminal apparatus 41.

Figure 19:
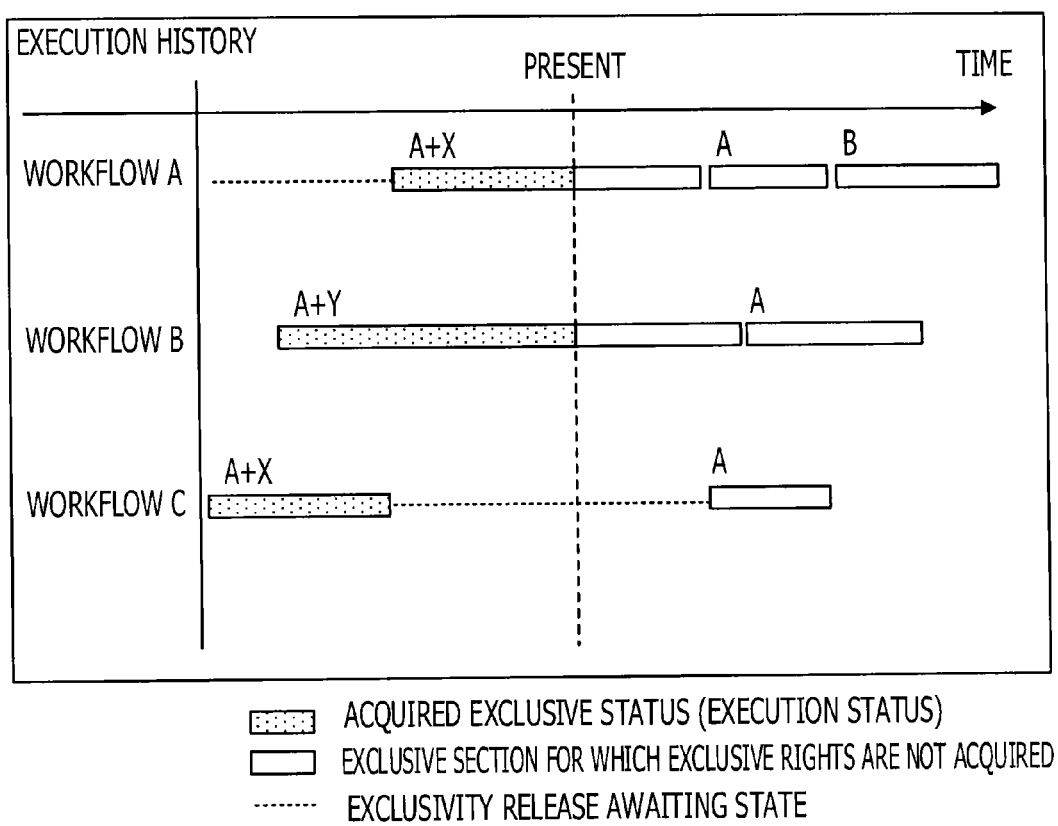
FIG. 19 illustrates a display example of a screen for a terminal, according to the present embodiment.

FIG. 19 illustrates a display example of a screen of a terminal in the present embodiment. As illustrated in FIG. 19, in each workflow, the exclusivity terminated state (execution terminated state) according to the acquired exclusive permission, the exclusive sections for which exclusive permission are not yet acquired, and the exclusive release waiting state are displayed on the screen of the terminal.

Below, more specific description will be given of examples of the present embodiment.

Figure 20:
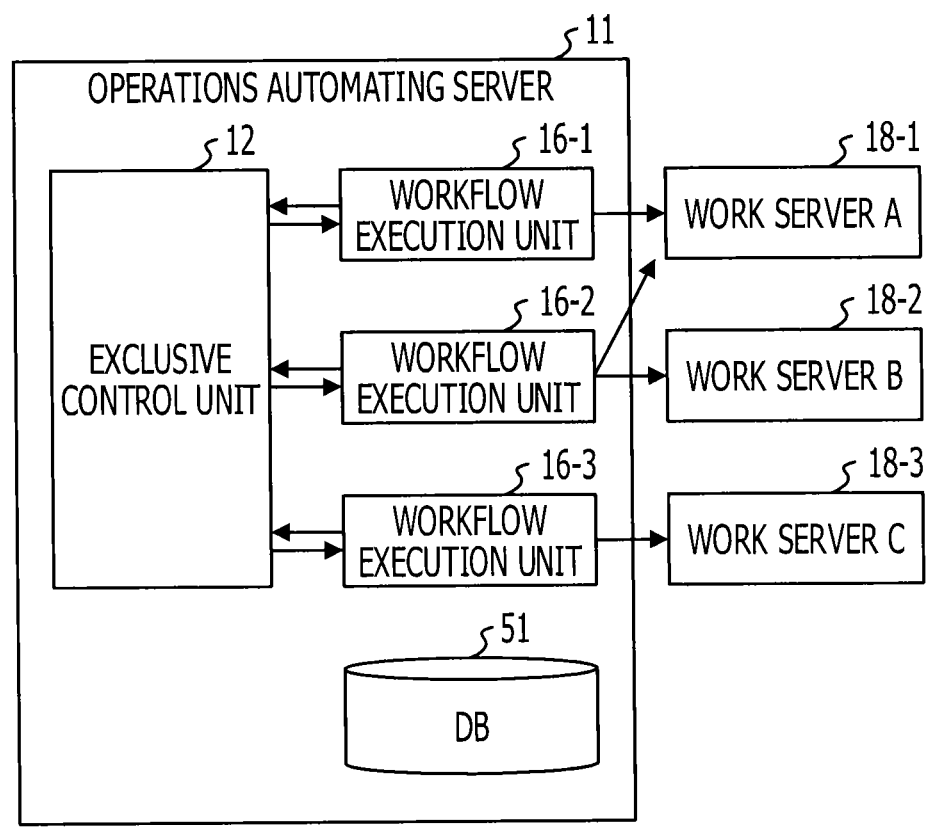
FIG. 20 illustrates an operational system according to an example in the present embodiment.

FIG. 20 illustrates an operational system according to an example of the present embodiment. The operational system includes the operations automating server 11 and one or more business servers 18. The business server 18 includes business servers A (18-1), B (18-2), and C (18-3). The business servers A (18-1), B (18-2), and C (18-3) execute various kinds of business processes. The operations automating server 11 automates and manages the running of the business servers A (18-1), B (18-2), and C (18-3).

Figure 21:
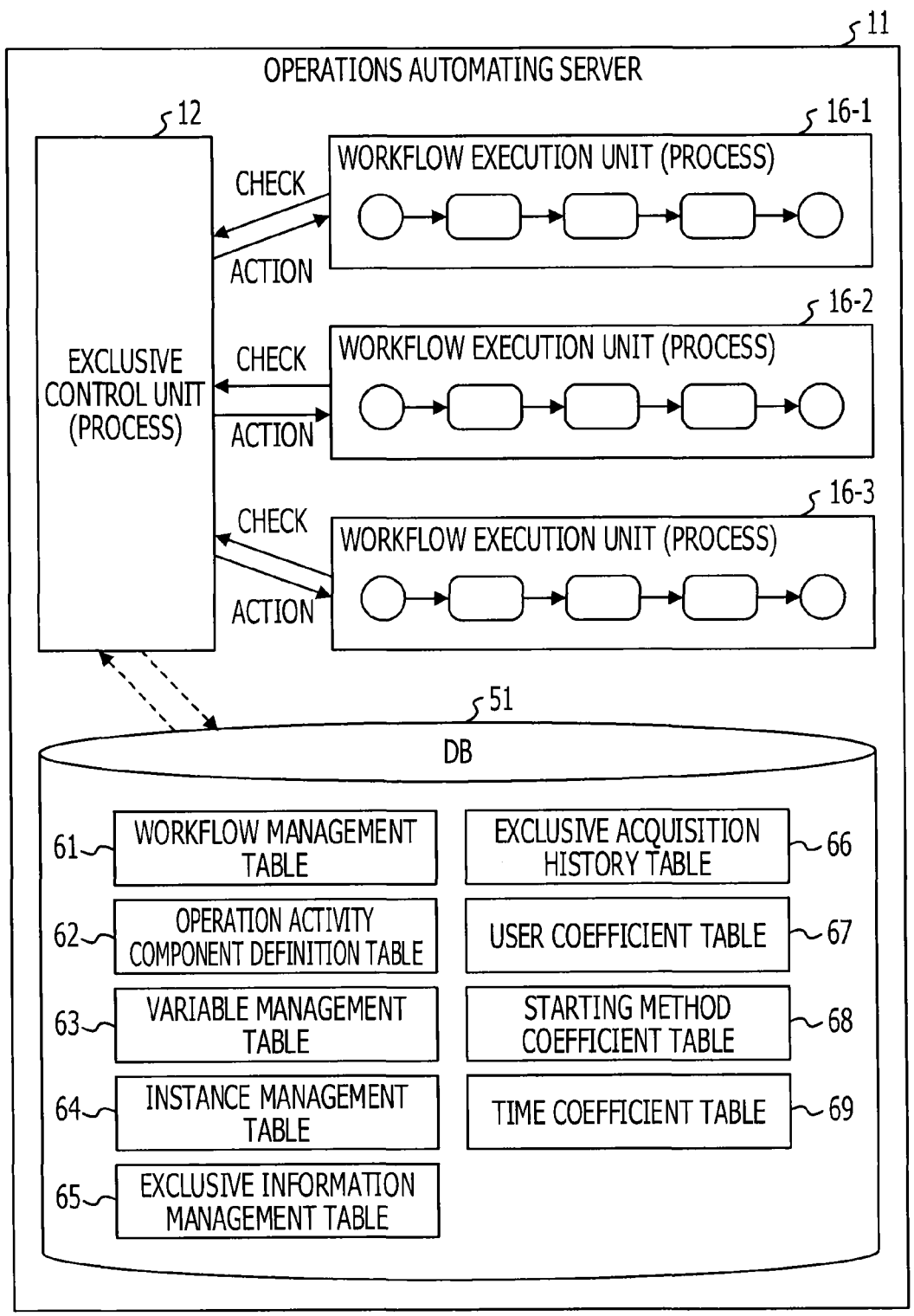
FIG. 21 illustrates an operations automating server according to an example of the present embodiment.

FIG. 21 illustrates an operations automating server in an example in the present embodiment. The operations automating server 11 includes the mutual exclusion unit 12, workflow execution units 16 (16-1, 16-2, and 16-3), and a database (DB) 51.

The workflow execution units 16 execute processes based on the workflows in the business servers 18 (18-1, 18-2, and 18-3) based on the response (Action) from the mutual exclusion unit 12 after checking with the mutual exclusion unit 12 what kind of mutual exclusion is being executed (Check).

The mutual exclusion unit 12 executes mutual exclusion of the workflow and controls the running of the workflow execution units 16 (16-1, 16-2, and 16-3) (Action), based on checking (Check) with each of the workflow execution units 16 (16-1, 16-2, and 16-3).

The DB 51 stores a workflow management table 61, a workflow component definition table 62, a variable management table 63, an instance management table 64, an exclusive information management table 65, and an exclusive acquisition history table 66. Furthermore, the DB 51 stores a user coefficient table 67, a starting method coefficient table 68, and a time coefficient table 69.

FIG. 22 illustrates an example of the workflow management table 61 in an example in the present embodiment. The workflow management table 61 is a table for managing the workflow components included in each workflow, and is generated during registration of the workflows.

The workflow management table 61 includes the data fields "Workflow Number" 61-1, "Component Number" 61-2, "Workflow component Name" 61-3, "Activity target" 61-4, "Activity services and Resources" 61-5, "Output" 61-6, and "Next Component Number" 61-7.

In "Workflow Number" 61-1, a number identifying the workflow is stored. In "Component Number" 61-2, the numbers for the workflow components in the workflows are stored. In "Workflow component Name" 61-3, the titles (activity content) of the workflow components are stored.

In the "Activity target" 61-4, the server, which is the activity target, and the variable corresponding to the title of the device or the like are stored as input values. In the "Activity services and Resources" 61-5, the service name to be run, and the variable corresponding to the resources name are stored as input values. In the "Output" 61-6, the variable in which the output value is set is stored. In "Next Component Number" 61-7, the Component Number of the workflow component to be executed next in the workflow is stored.

FIG. 23 illustrates an example of a workflow component definition table in an example according to the present embodiment. The workflow component definition table 62 stores in advance defining information of the workflow components. The workflow component definition table 62 includes the data fields "Workflow component Name" 62-1, "Component classification" 62-2, "Activity/Confirmation Target" 62-3, and "Activity Importance level" 62-4.

In "workflow component name" 62-1, the name (activity content) of a workflow component are stored. In "component classification" 62-2, the classification (action component, confirmation component, notification component, setting component, and the like) of the workflow component is stored. In "Activity/Confirmation Target" 62-3, the target of the activity of the workflow component or the target of the confirmation is stored. In "Activity Importance level" 62-4, the activity importance level of the workflow component is stored.

Figure 24:
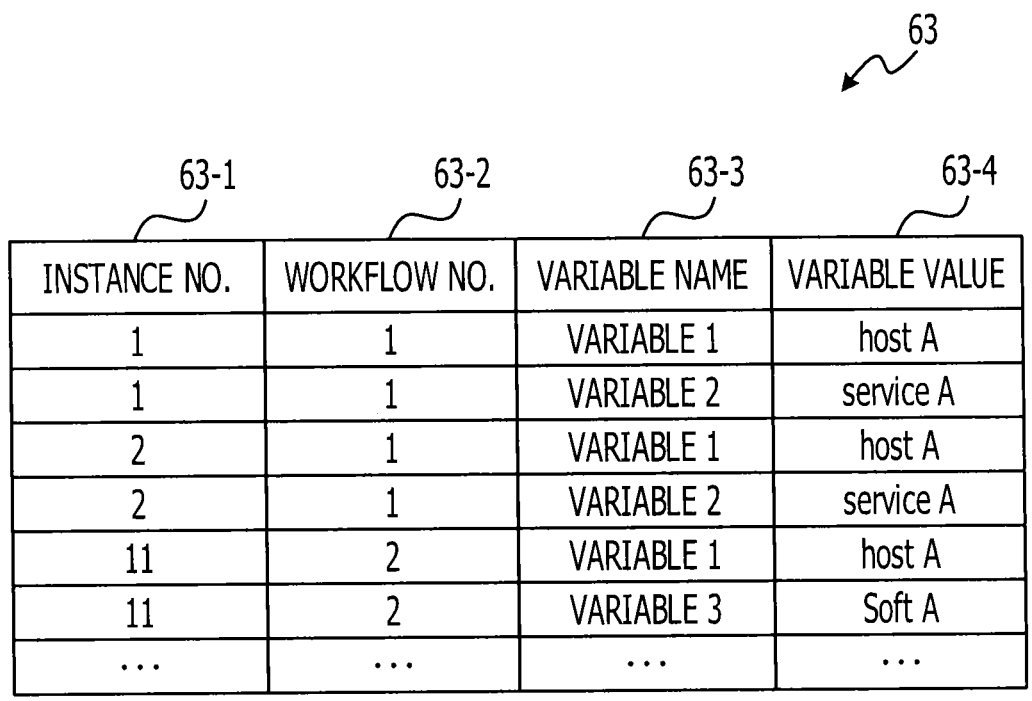
FIG. 24 illustrates an example of a variable management table according to an example of the present embodiment.

FIG. 24 illustrates an example of a variable management table in an example according to the present embodiment. The variable management table 63 manages the variable name and the variable value used in the instance which is information that identifies the substance of the defined workflow information. The variable management table 63 includes the data fields "Instance Number" 63-1, "Workflow" 63-2, "Variable Name" 63-3, and "Variable Value" 63-4.

In "Instance Number" 63-1, the number identifying the instance illustrating the substance of the defined workflow information is stored. In "Workflow Number" 63-2, the workflow number is stored. In "Variable Name" 63-3, the variable name is stored. In "Variable Value" 63-4, the value set by the variable is stored.

FIG. 25 illustrates an example of an instance management table in an example according to the present embodiment. The instance management table 64 stores information that is managed on a per-instance basis. The instance management table 64 includes the data fields "Instance Number" 64-1, "Workflow Number" 64-2, "Component Number (Current)" 64-3, "Host Name" 64-4, "Service Name" 64-5, "User ID" 64-6, "Starting Method Coefficient" 64-7, "Exclusivity Number" 64-8, and "Estimated Completion Time" 64-9.

In "Instance Number" 64-1, the instance number is stored. In "Workflow Number" 64-2, the workflow number is stored. In "Component Number (Current)" 64-3, the Component Number of the workflow component corresponding to the present processing position of the workflow is stored.

In "Host Name" 64-4, the host name is stored. In "Service Name" 64-5, the service name is stored. In "User ID" 64-6, the information identifying the user (for example, a user ID) is stored.

In "Starting Method Coefficient" 64-7, the starting method coefficient is stored. In "Exclusivity Number" 64-8, the number identifying the exclusive section is stored. In "Estimated Completion Time" 64-9, the estimated completion time of the workflow is stored.

Figure 26:
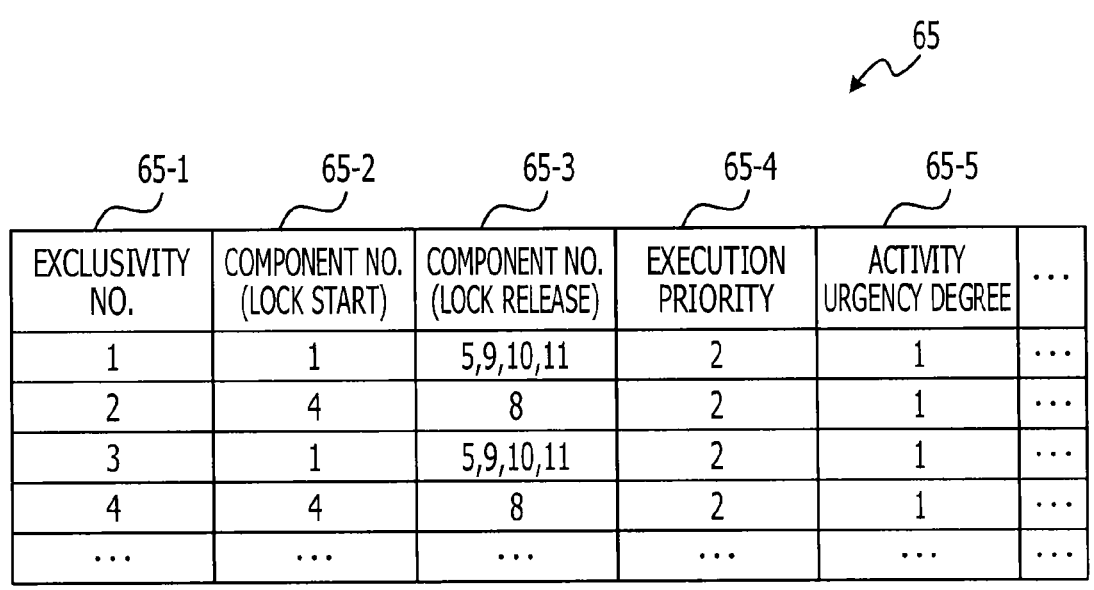
FIG. 26 illustrates an example of an exclusive information management table in an example of the present embodiment.

FIG. 26 illustrates an example of an exclusive information management table in an example in the present embodiment. The exclusive information management table 65 manages information relating to the exclusive sections. The exclusive information management table 65 includes the data fields "Exclusivity Number" 65-1, "Component Number (Lock Start)" 65-2, "Component Number (Lock Release)" 65-3, "Execution Priority" 65-4, and "Activity Urgency level" 65-5.

In "Exclusivity Number" 65-1, the number identifying the exclusive section is stored. In "Component Number (Lock Start)" 65-2, the Component Number of the workflow component of the start of the exclusive sections is stored. In "Component Number (Lock Release)" 65-3, the component number of the workflow component of the last of the exclusive sections is stored. In "Execution Priority" 65-4, the execution priority of the exclusive sections is stored. In "Activity Urgency level" 65-5, the activity urgency level of the exclusive sections is stored.

FIG. 27 illustrates an example of an exclusive information management table in an example according to the present embodiment. The exclusivity acquisition history table 66 manages history information for acquisition of exclusive permission (execution permission) for the exclusive sections. The exclusivity acquisition history table 66 includes the data fields "Instance Number" 66-1, "Workflow Number" 66-2, "Exclusive Section Number" 66-3, "Start Waiting Time" 66-4, "Start Time" 66-5, and "Completion Time" 66-6.

In "Instance Number" 66-1, the instance number is stored. In "Workflow Number" 66-2, the workflow number is stored. In "Exclusive Section Number" 66-3, the exclusive section number is stored. In "Start Waiting Time" 66-4, the amount of waiting time until the exclusive section acquires the exclusive permission (execution permission) is stored. In "Start Time" 66-5, the time at which the exclusive section acquires the exclusive permission (execution permission) is stored. In "Completion Time" 66-6, the completion time for when the exclusive section acquires the exclusive permission (execution permission) and executes the processing is stored.

Figure 28:
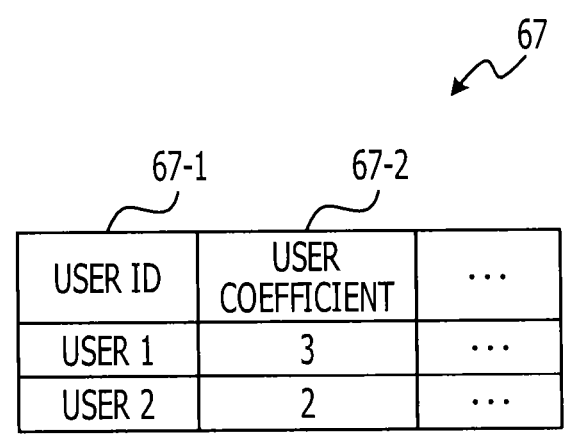

FIG. 28 illustrates an example of a user coefficient table in an example according to the present embodiment. In the user coefficient table 67, the user coefficient for each user is stored in advance. The user coefficient table 67 includes data fields "User ID" 67-1 and "User Coefficient" 67-2. In "User ID" 67-1, information identifying the user (user ID) is stored. In "User Coefficient" 67-2, the user coefficient for the user ID is stored.

FIG. 29 illustrates an example of a startup method coefficient table in an example according to the present embodiment. The starting method coefficient table 68 includes the data fields "Starting Method" 68-1, and "Starting Method Coefficient" 68-2. In "Starting Method" 68-1, the method for starting the workflow is stored. In "Starting Method Coefficient" 68-2, the starting method coefficient for the starting method is stored.

Figure 30:
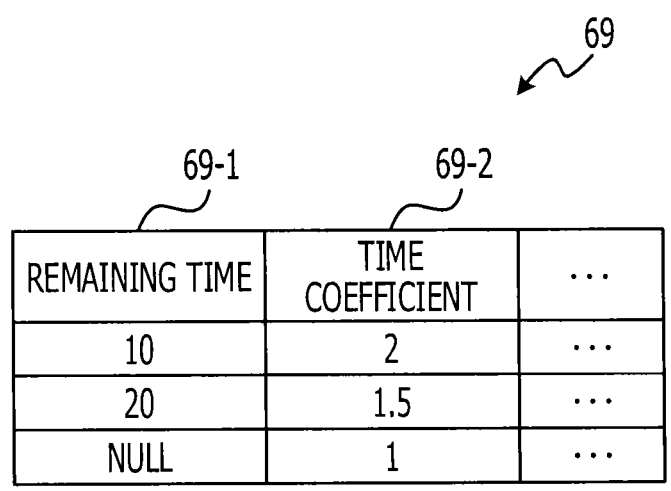
FIG. 30 illustrates an example of a time coefficient table according to an example of the present embodiment.

FIG. 30 illustrates an example of a time coefficient table in an example according to the present embodiment. The time coefficient table 69 has the data fields "Remaining Time" 69-1, and "Time Coefficient" 69-2. In "Remaining Time" 69-1, the remaining amount of time until the estimated completion time is stored. In "Time Coefficient" 69-2, the time coefficient corresponding to the remaining amount of time is stored.

Figure 31:
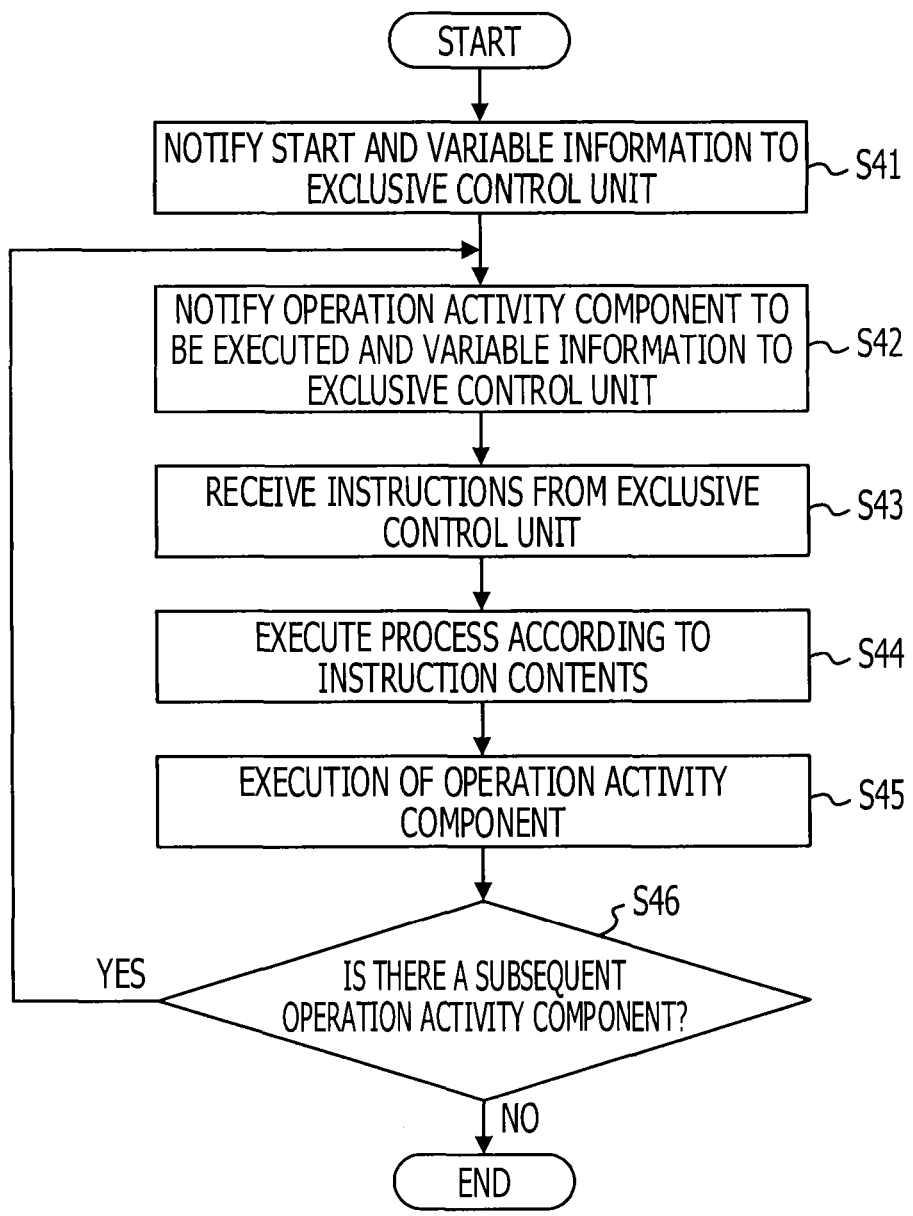
FIG. 31 illustrates an example of a process flow for a workflow execution unit according to an example of the present embodiment.

FIG. 31 illustrates an example of a process flow according to the workflow execution unit 16 in an example according to the present embodiment. The workflow execution unit 16 provides the mutual exclusion unit 12 with notification of the information of the variables used at the execution start of the workflow and when the workflow is running (S41). For example, the information relating to the variables includes information about the user ID for the user starting the workflow, the method for starting the workflow, and the like.

The workflow execution unit 16 provides the mutual exclusion unit 12 with notification of the workflow component to be executed, and the information about the variables used by the workflow component (S42). The workflow execution unit 16 receives instructions from the mutual exclusion unit 12 (S43) and executes the processing according to the content of the instructions (S44). Accordingly, the workflow execution unit 16 executes the processing corresponding to the workflow component in the business server 18 (S45). In the workflow to be executed, when there is another workflow component ("Yes" in S46), the process returns to the process of S42. In the workflow to be executed, when the processing is completed for all the workflow components ("No" in S46), the current flow finishes.

Figure 32:
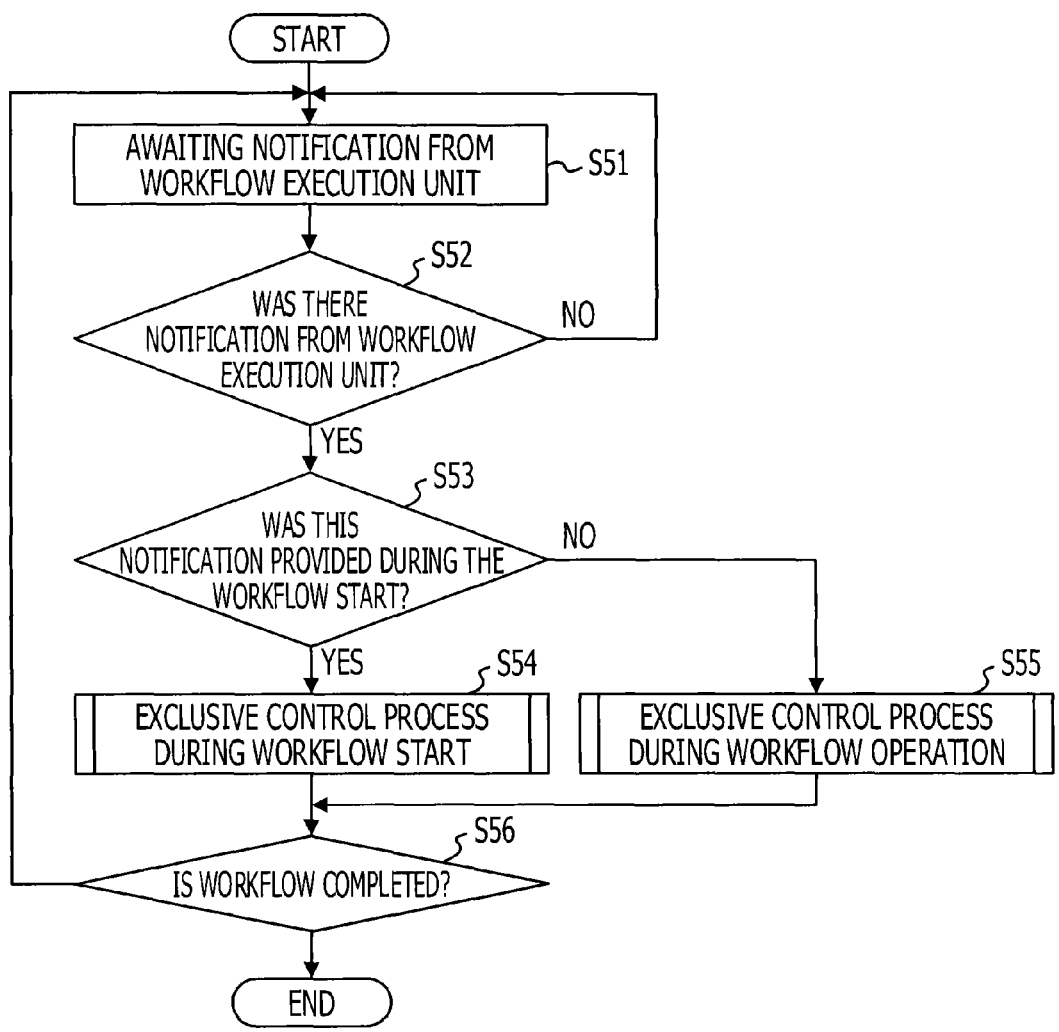
FIG. 32 illustrates an example of an overall process flow for an mutual exclusion unit according to an example of the present embodiment.

FIG. 32 illustrates an example of an overall process flow of the mutual exclusion unit 12 in an example in the present embodiment. The mutual exclusion unit 12 enters a waiting state until there is notification from the workflow execution unit 16 ("No" in S52) (S51).

When there was notification of the start of the workflow in S41 of FIG. 31 from the workflow execution unit 16 ("Yes" in S52 and "Yes" in S53), the mutual exclusion unit 12 executes mutual exclusion process for the start of the workflow (S54). Thereafter, the process returns to S51.

When there was notification in S42 of FIG. 31 from the workflow execution unit 16 ("Yes" in S52 and ("No" in S53), the mutual exclusion unit 12 executes the mutual exclusion process when the workflow is running (S55). Thereafter, the process returns to S51.

Figure 33:
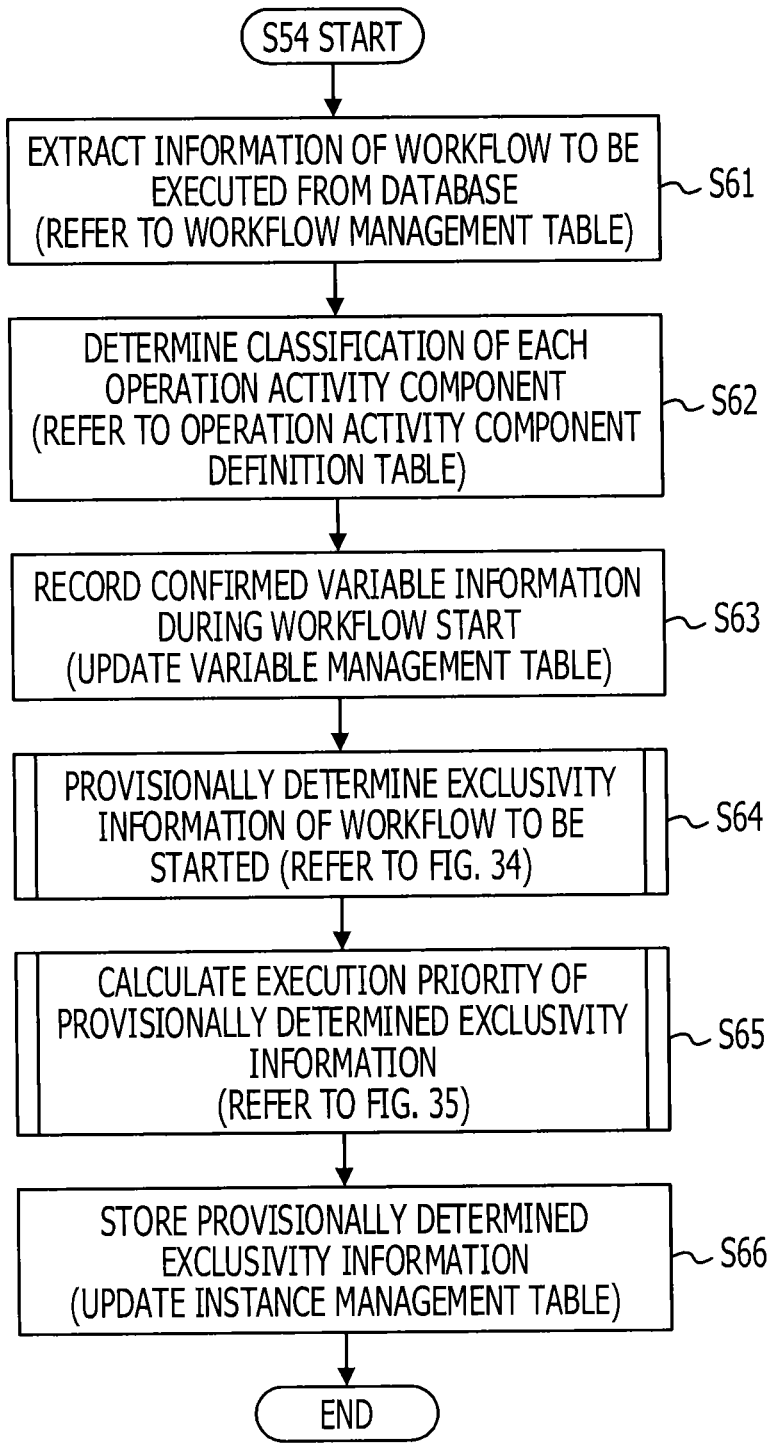
FIG. 33 illustrates a flow for a mutual exclusion process (S54) during workflow start in an example of the present embodiment.

FIG. 33 illustrates a flow of a mutual exclusion process (S54) for the start of a workflow in an example in the present embodiment. The mutual exclusion unit 12 acquires the workflow information of the execution target from the workflow management table 61 (S61).

The mutual exclusion unit 12 acquires the "component classification" corresponding to the "workflow component name" included in the workflow information of the execution target from the workflow component definition table 62 (S61). Accordingly, the mutual exclusion unit 12 determines the classification of the workflow component included in the workflow information of the execution target.

Next, the mutual exclusion unit 12 records the settled variable information during the workflow start in the variable management table 63 (S63). The settled variable information during the workflow start is, for example, variables for which values are set in advance, variables passed on from the workflow execution unit 16, or the like.

Next, the mutual exclusion unit 12 provisionally determines the exclusive information of the workflow to be started (S64). The process of S64 will be described in detail using FIG. 34.

Next, the mutual exclusion unit 12 calculates the execution priority of the provisionally determined exclusive information (S65). The process of S65 will be described in detail using FIG. 35.

Next, the mutual exclusion unit 12 stores the provisionally determined exclusive information in the instance management table 64.

Figure 34:
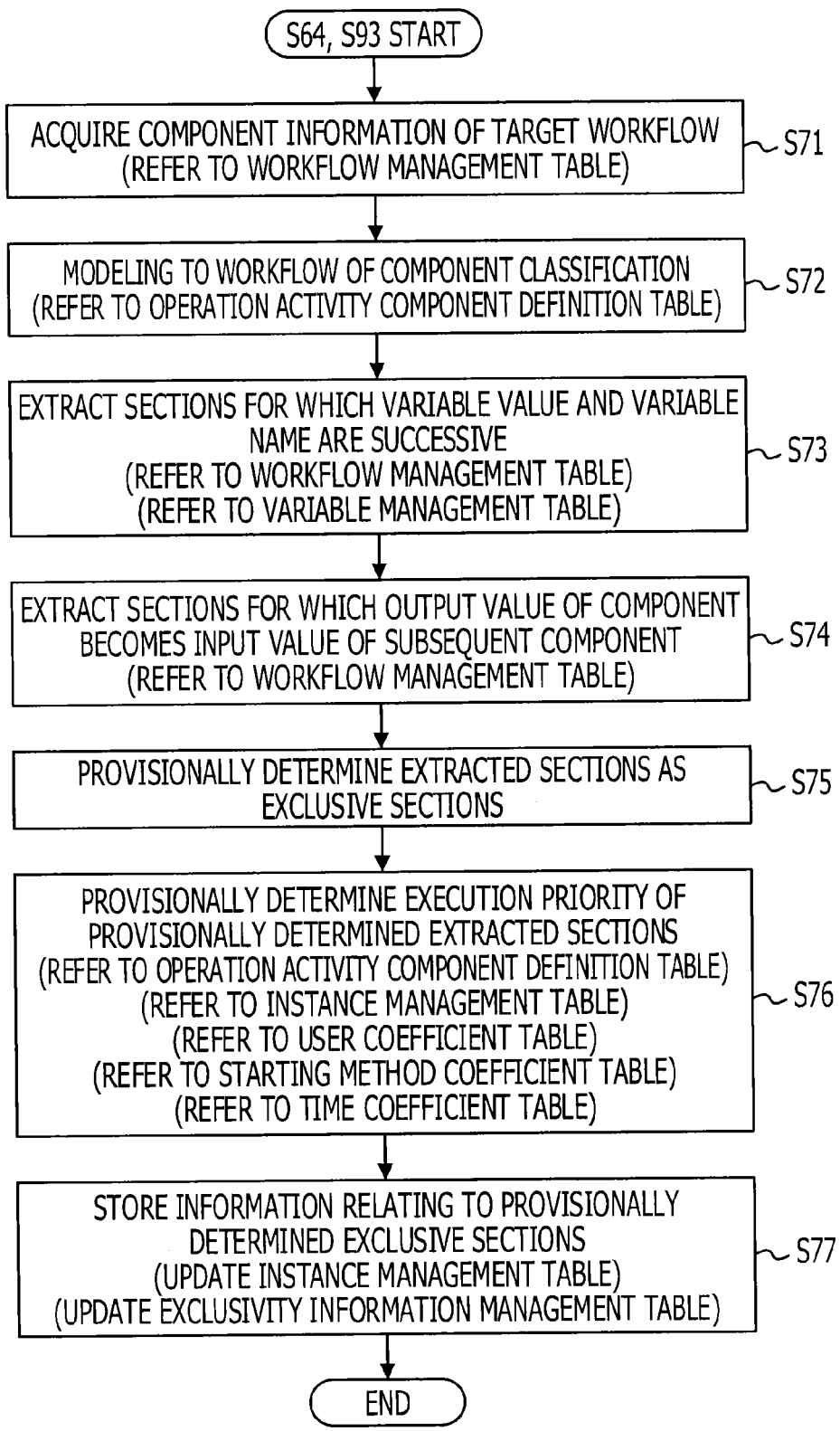
FIG. 34 illustrates a flow for an exclusive information provisional determining process in an example of the present embodiment.

FIG. 34 illustrates a flow of an exclusive information provisional determining process in an example in the present embodiment. This flow illustrates the details of the processes of S64 of FIG. 32 and S93 of FIG. 36 that is to be described later. The mutual exclusion unit 12 acquires information about the workflow component of the target workflow from the workflow management table 61 (S71).

The mutual exclusion unit 12 models the workflow components included in the target workflow using the workflow component definition table 62 (S72). That is, the mutual exclusion unit 12 converts the workflow components included in the target workflow into the corresponding component classifications by using the workflow component definition table 62.

The mutual exclusion unit 12 extracts the workflow components for which the values of the variables or the variable names are successive in the target workflow by using the workflow management table 61 and the variable management table 63. That is, the mutual exclusion unit 12 determines the process order of the component classification (modeled operational management parts) inside the target workflow from "Component Number" 61-2 and "Next Component Number" 61-7 of the workflow management table 61. Next, the mutual exclusion unit 12 determines whether the values of the variables of the same component classifications or the same variable names are successive in the process order by using the variable management table 63. As a result, the mutual exclusion unit 12 extracts the workflow components (sections) for which the values of the variables of the same component classifications or the same variable names are successive in the process order from the workflow management table 61 (S73).

The mutual exclusion unit 12 extracts the workflow components (sections) for which the output value of the workflow components becomes the input value of the subsequent workflow component, based on the process order by using the data fields "Activity target", "Activity Services, Resources", and "Output" of the workflow management table 61 (S74).

In S73 or S74, the mutual exclusion unit 12 provisionally determines the extracted section as the exclusive section (S75).

The mutual exclusion unit 12 provisionally determines the execution priority of the provisionally determined exclusive sections by using the workflow component definition table 62, the user coefficient table 67, the starting method coefficient table 68, and the time coefficient table 69 (S76). That is, the mutual exclusion unit 12 acquires the activity importance levels corresponding to the component classifications included in the provisionally determined exclusive sections from the workflow component definition table 62, and adds the activity importance levels together.

In addition, the mutual exclusion unit 12 acquires the user coefficient corresponding to the user ID of the user starting the workflow from the user coefficient table 67. In addition, the mutual exclusion unit 12 acquires the starting method coefficient corresponding to the starting method of the workflow from the starting method coefficient table 68.

In addition, the mutual exclusion unit 12 calculates the remaining amount of time until the estimated completion time from the difference between the estimated completion time of the workflow and the present time. Here, the mutual exclusion unit 12 may calculate the estimated completion time of the workflow based on the amount of time taken until the completion of each workflow component registered in advance. In addition, the mutual exclusion unit 12 may set the completion time acquired from the history information (exclusive acquisition history table 66) of the workflows executed in the past, as the estimated completion time.

The mutual exclusion unit 12 acquires the time coefficient corresponding to the calculated remaining amount of time from the time coefficient table 69. Then, the mutual exclusion unit 12 calculates the activity urgency level using the above-described formula (1), and calculates the execution priority using the above-described formula (2).

The mutual exclusion unit 12 stores the information (information used in S73 to S76 such as provisionally determined exclusive sections, execution priority, user coefficient, starting method coefficient, and activity urgency level) relating to the provisionally determined exclusive sections in the instance management table 64 and the exclusive information management table 65 (S77).

Figure 35:
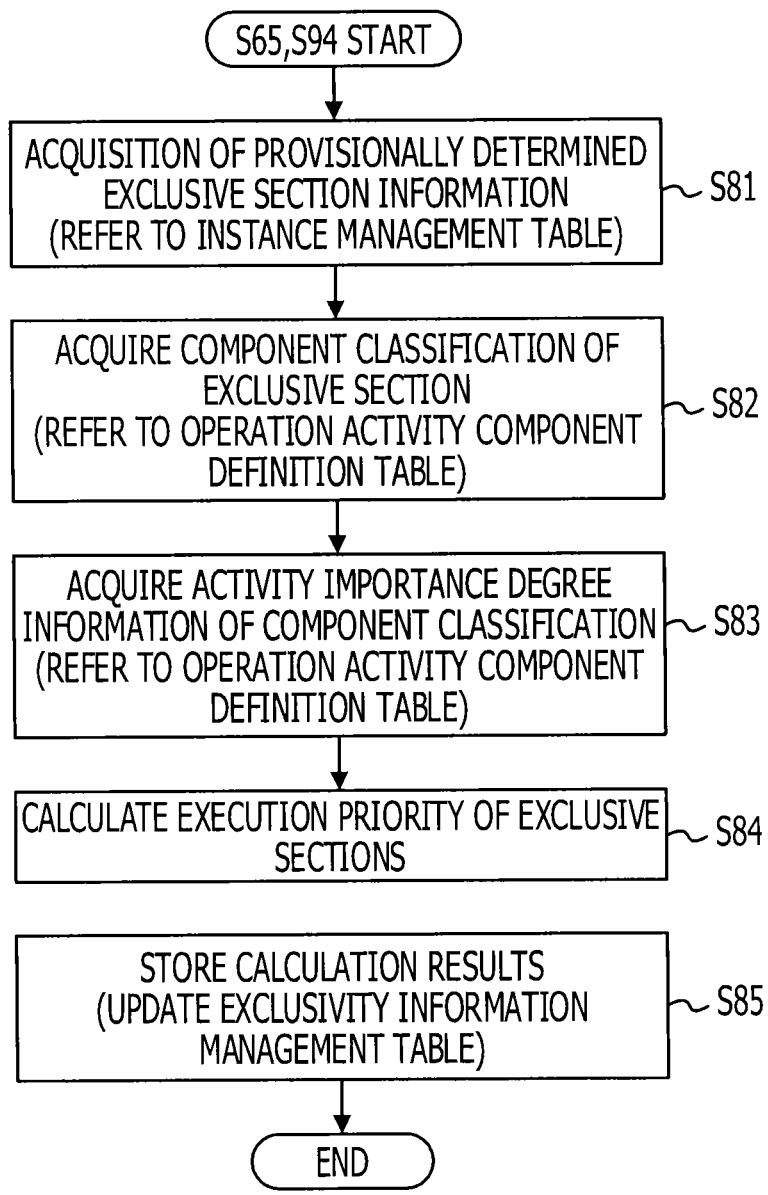
FIG. 35 illustrates a flow for an execution priority calculation process for exclusive information according to an example of the present embodiment.

FIG. 35 illustrates a flow of an execution priority calculation process for exclusive information in an example in the present embodiment. This flow illustrates the details of the processes of S65 of FIG. 32 and S94 of FIG. 36 that is to be described later. The mutual exclusion unit 12 acquires the information (user coefficient, starting method coefficient, exclusivity number, estimated completion time, and the like) relating to the provisionally determined exclusive sections from the instance management table 64 (S81). The mutual exclusion unit 12 acquires the component classification and the activity importance level information included in the exclusive section corresponding to the exclusivity number from the workflow component definition table 62 (S82, S83).

The mutual exclusion unit 12 subtracts the present time from the estimated completion time acquired in S81, calculates the remaining amount of time until the estimated completion time, and acquires the time coefficient corresponding to the calculated remaining amount of time from the time coefficient table 69. The mutual exclusion unit 12 calculates the activity urgency level using the above-described formula (1) and calculates the execution priority of the exclusive sections using the above-described formula (2). The mutual exclusion unit 12 stores the calculated activity urgency level and execution priority in the exclusive information management table 65 (S85).

Figure 36:
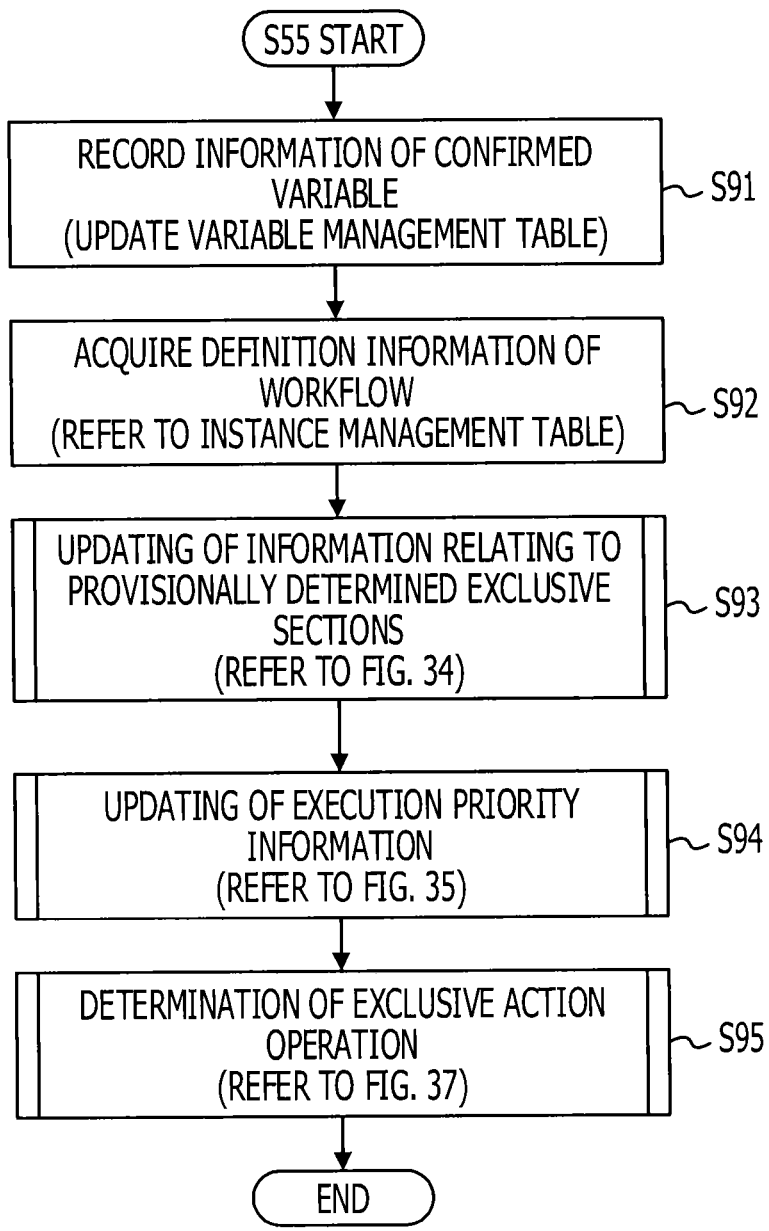
FIG. 36 illustrates a flow for a mutual exclusion process (S55) when a workflow is running according to an example of the present embodiment.

FIG. 36 illustrates a flow of a mutual exclusion process (S55) when a workflow is running in an example according to the present embodiment. The mutual exclusion unit 12 stores information about the variables included in the information notified by the workflow execution unit 16 (information about the settled variables), or the variables for which a value is set in advance in the variable management table 63 (S91).

The mutual exclusion unit 12 acquires the defining information for the workflow from the instance management table 64 (S92).

The mutual exclusion unit 12 updates the information relating to the provisionally determined exclusive sections (S93). The details of the process of S93 are the same as described in FIG. 34.

The mutual exclusion unit 12 updates the execution priority information (S94). The details of the process of S94 are the same as described in FIG. 35.

The mutual exclusion unit 12 determines an exclusive activity (S95). The process of S95 will be described in detail using FIG. 37.

Figure 37:
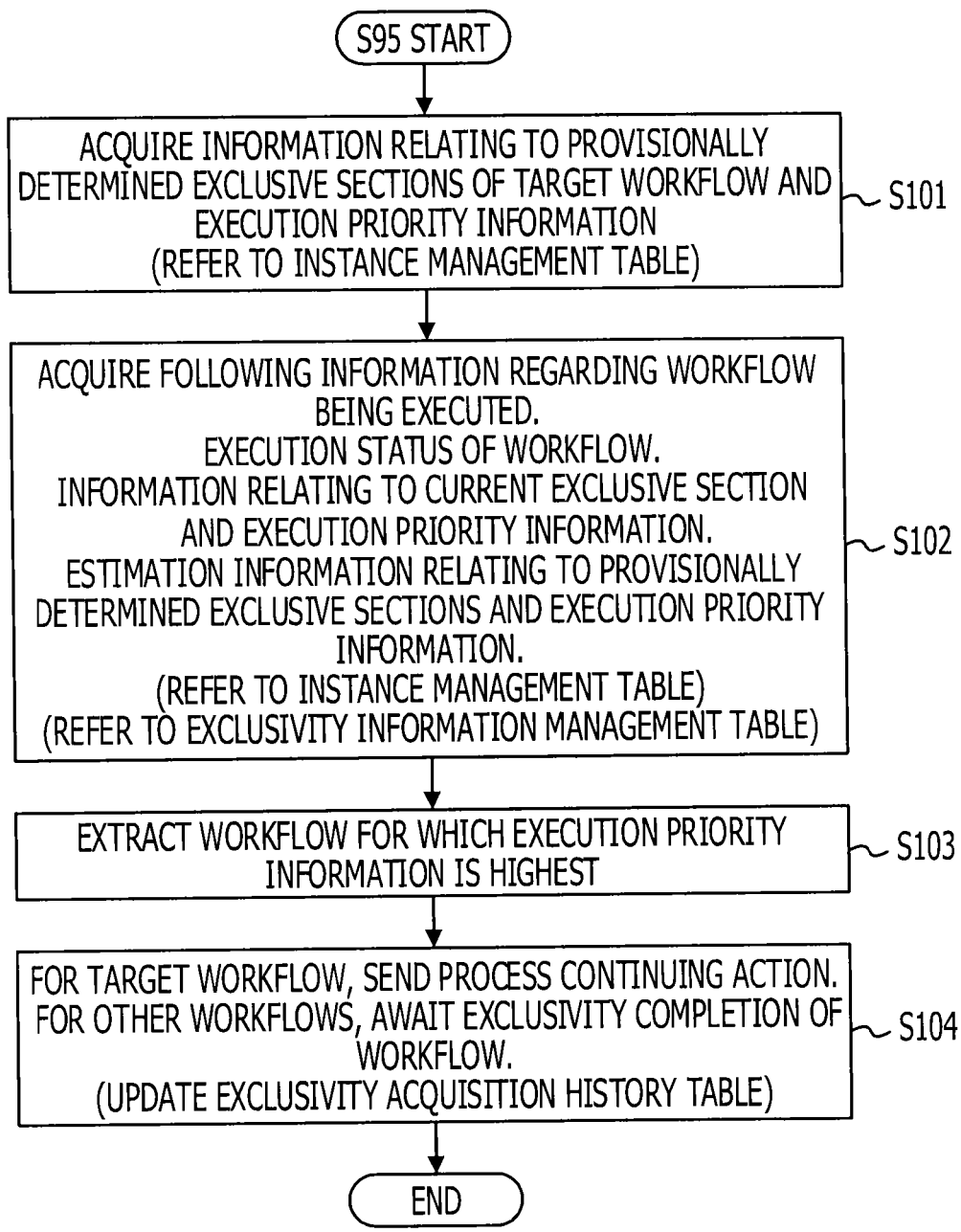
FIG. 37 illustrates a flow for an exclusive activity (operation) determining process according to an example of the present embodiment.

FIG. 37 illustrates a flow of an exclusive activity determining process in an example in the present embodiment. The mutual exclusion unit 12 acquires information relating to the provisionally determined exclusive sections and the execution priority information for the target workflow (S101). Here, the mutual exclusion unit 12 acquires the information (exclusivity number and the like) relating to the provisionally determined exclusive section for the target workflow from the instance management table 64. The mutual exclusion unit 12 sets the exclusivity number as a key and acquires the execution priority from the exclusive information management table 65.

Next, for the workflow being executed, the mutual exclusion unit 12 acquires the execution status of the workflow, the information relating to the present exclusive section and execution priority information, the estimated information relating to the provisionally determined exclusive section, and the execution priority information (S102). Here, the mutual exclusion unit 12 acquires the execution status of the workflow by reading the instance management table 64.

The mutual exclusion unit 12 acquires information relating to the present exclusive section for the workflow being executed (excluding the target workflow) from the instance management table 64 and the exclusive information management table 65. Here, firstly, the mutual exclusion unit 12 determines the workflow component (present process position) which is the present target in the workflow from "Component Number (Current)" 64-3 of the instance management table 64. The mutual exclusion unit 12 determines in which exclusive section the workflow component (present process position) is included using the instance management table 64 and the workflow management table 61. The mutual exclusion unit 12 sets the exclusivity number of the determined exclusive section as a key and acquires the execution priority from the exclusive information management table 65.

The mutual exclusion unit 12 acquires information relating to the provisionally determined exclusive section for the workflow being executed (excluding the target workflow) from the instance management table 64 and the exclusive information management table 65. Here, first, the mutual exclusion unit 12 acquires from the instance management table 64 information about the exclusive sections other than the exclusive sections to which the workflow component (present process position) which is the present target in the workflow belongs. The mutual exclusion unit 12 sets the exclusivity number of the exclusive sections as a key and acquires the execution priority from the exclusive information management table 65.

The mutual exclusion unit 12 extracts the workflow with the highest execution priority information among the target workflow and the workflows acquired in S102 (S103).

When the workflow extracted in S103 is the target workflow (workflow executed by the workflow execution unit 16 to which notification is provided), the mutual exclusion unit 12 sends notification that the process of the target workflow is to be continued to the workflow execution unit 16. Conversely, when the extracted workflow is a workflow other than the target workflow, the mutual exclusion unit 12 sets the target workflow to the processing wait state by not sending the notification to continue to the workflow execution unit 16 until the workflow loses the exclusive permission (execution permission). At this point, the mutual exclusion unit 12 registers the information in the exclusivity acquisition history table 66 or updates the exclusivity acquisition history table 66 (S104). For example, with an exclusive section for which the exclusive permission are acquired and the processing is completed, the information of "Completion Time" 66-6 is updated. In addition, with an exclusive section awaiting exclusivity release, the information of "Start Waiting Time" 66-4 is updated.

Figure 38:
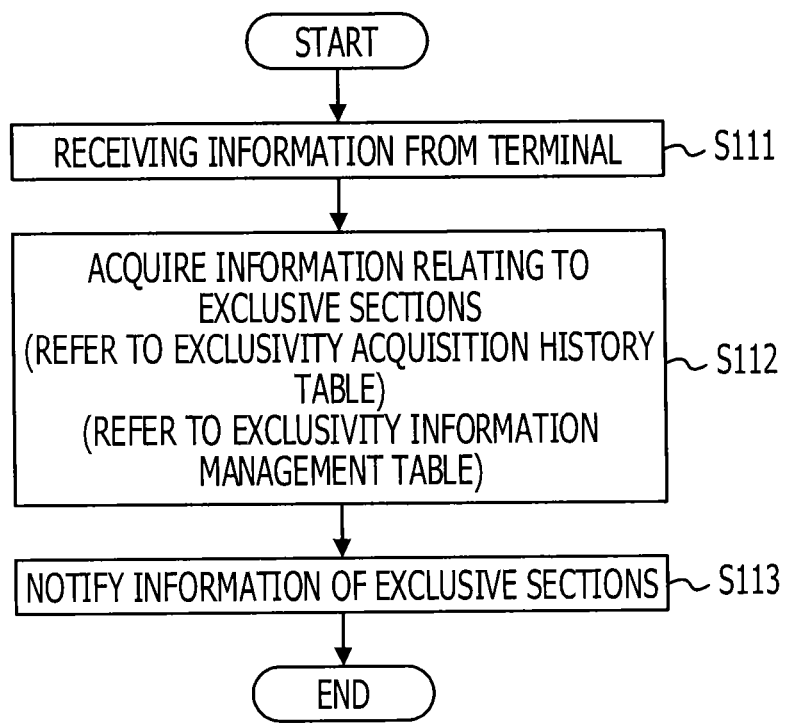
FIG. 38 illustrates a flow for a screen display according to an example of the present embodiment.

FIG. 38 illustrates a flow for screen display in an example in the present embodiment. Upon receiving a display request from the terminal apparatus 41 (S111), the mutual exclusion unit 12 acquires information relating to the exclusive section from the exclusive information management table 65 and the exclusive acquisition history table 66 (S112). That is, with regard to the exclusive sections for which exclusive permission (execution permission) has already been acquired, the mutual exclusion unit 12 acquires information relating to the exclusive sections from the exclusivity acquisition history table 66. With regard to exclusive sections for which exclusive permission (execution permission) has not yet been acquired, the mutual exclusion unit 12 acquires information relating to the exclusive sections from the exclusivity information management table 65. The mutual exclusion unit 12 notifies the terminal apparatus 41 of the acquired information that relates to the exclusive section (S113).

Figure 39:
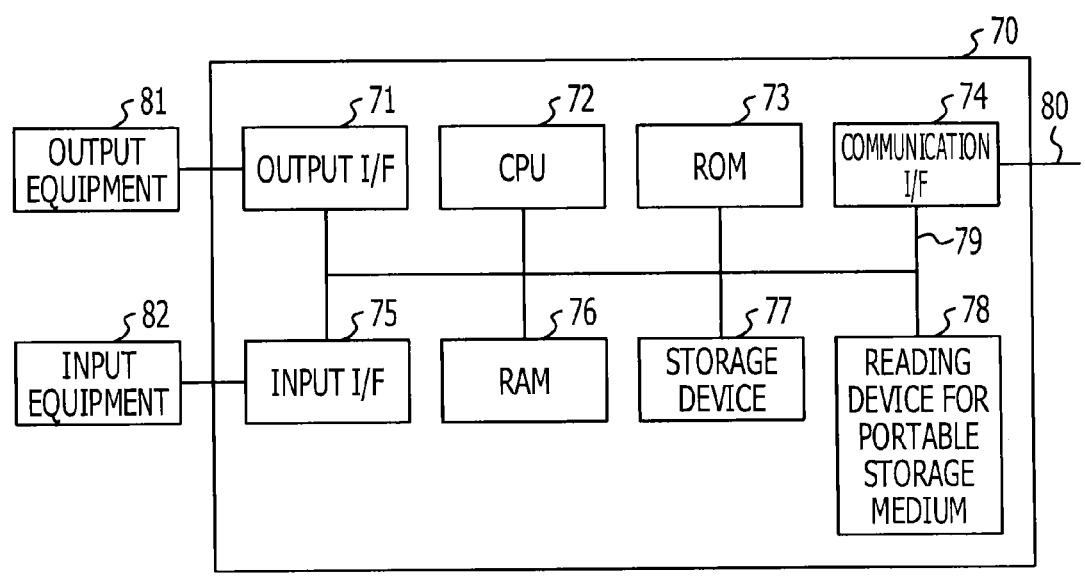
FIG. 39 illustrates a configuration block diagram of a hardware environment for a computer, according to an example of the present embodiment.

FIG. 39 is a configuration block diagram of a hardware environment of a computer relating to an example according to the present embodiment. A computer 70 functions as the mutual exclusion unit 12 by reading a program that performs the processing of the present embodiment.

The computer 70 includes an output interface (I/F) 71, a central processing unit (CPU) 72, a read-only memory (ROM) 73, a communication I/F 74, an input I/F 75, a random access memory (RAM) 76, the storage device 77, a reading device 78, and a bus 79. The computer 70 is connected to output equipment 81 and input equipment 82.

The bus 79 is connected to the output I/F 71, the CPU 72, the ROM 73, the communication I/F 74, the input I/F 75, the RAM 76, the storage device 77, and the reading device 78. The reading device 78 is a device which reads a portable recording medium. The output equipment 81 is connected to the output I/F 71. The input equipment 82 is connected to the input I/F 75.

As the storage device 77, it is possible to use various types of storage devices such as hard disk drives, flash memory devices, and magnetic disk devices. For example, the storage device 77 or the ROM 73 stores a program that executes the processes described in the present embodiment. In addition, the storage device 77 or the ROM 73 stores workflow data that includes workflow components or the like, the workflow management table 61, the workflow component definition table 62, the variable management table 63, the instance management table 64, and the like. In addition, the storage device 77 or the ROM 73 stores the exclusive information management table 65, and the exclusive acquisition history table 66. Furthermore, the DB 51 stores the user coefficient table 67, the starting method coefficient table 68, the time coefficient table 69, and the like.

The CPU 72 reads a program that executes the processes described in the present embodiment and is stored in the storage device 77 or the ROM 73 and executes the program. For example, the CPU 72 functions as the mutual exclusion unit 12 (modeling unit 13, setting unit 14 and display control unit 15) as a result of executing the program.

The program executing the processes described in the present embodiment may, for example, be stored in the storage device 77 via a communication network 80 from a program provider and the communication I/F 74. In addition, the program executing the processes described in the present embodiment may be stored in a commercially available, widely used, portable storage medium. In this case, the portable storage medium may be set in the reading device 78, and the program may be read by the CPU 72 and executed. As the portable storage medium, it is possible to use various types of storage media such as a CD-ROM, a floppy disk, an optical disc, a magneto-optical disc, an IC card, or a USB memory device. The program stored on such a storage medium may be read by the reading device 78.

In addition, as the input equipment 82, it is possible to use a keyboard, a mouse, an electronic camera, a webcam, a mike, a scanner, a sensor, a tablet, a touch panel, or the like. In addition, as the output equipment 81, it is possible to use a display, a printer, a speaker, or the like. In addition, the communication network 80 may be a communication network such as the Internet, a LAN, a WAN, a dedicated line, a wired network, a wireless network, or the like.

According to the present embodiment, it is possible to dynamically determine exclusive sections that indicate units of mutual exclusion that perform an exclusive lock. As a result, the administrator is released from the burden of mutual exclusion and it is possible to achieve greater efficiency for operational tasks as a whole. In addition, since mutual exclusion is not desired to be added even when creating a large number of automatic operational processes, exclusive design is not desired to be carried out.

In addition, as well as mutual exclusion at the current time point, it is possible to predict the acquisition of exclusive sections by other workflows and perform mutual exclusion. Accordingly, since it is possible to dynamically determine an approximately optimum exclusive section, the efficiency of operational tasks as a whole is improved Accordingly, it is possible to achieve greater efficiency for operational tasks as a whole by determining an approximately optimum exclusive sections.

Since the workflow component of the reference system acquires information after the completion of an activity of the target server, it is possible to acquire the latest information. For this reason, the efficiency of operational tasks may be improved. Thus, it is possible to run the workflows based on the latest information.

In addition, since errors in relation to setting exclusivity and releasing exclusivity leaks may be less likely to occur, it is possible to reduce the generation of mistakes with regard to exclusivity.

Here, the present embodiment is not limited to the forms embodied in the above description, and it is possible to adopt various configurations and embodiments within a range not departing from the gist of the present embodiment.

According to the above-described examples, it is possible to dynamically determine exclusive sections that indicate units of mutual exclusion which perform an exclusive lock.

All examples and conditional language recited herein are intended for pedagogical purposes to aid the reader in understanding the invention and the concepts contributed by the inventor to furthering the art, and are to be construed as being without limitation to such for example recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process comprising:
   setting a first exclusive section in a first workflow and a second exclusive section in a second workflow, the first exclusive section including at least one first operation in which an exclusion control is executed, and the second exclusive section including at least one second operation in which the exclusion control is executed;
   calculating priorities of the first exclusive section and the second exclusive section using operation importance level information indicating importance levels of the at least one first operation and the at least one second operation; and
   executing the exclusion control between the first exclusive section and the second exclusive section based on the priorities, when a competition between the first exclusive section and the second exclusive section occurs, wherein
   the setting includes joining the first exclusive section and a third exclusive section set in the first workflow when variables used in the at least one first operation and another variables used in a third operation included in the third exclusive section are the same, and dividing the first exclusive section into at least two segments when the variables are changed according to the first operation.

2. The non-transitory computer-readable recording medium according to claim 1, wherein
   in the setting includes setting the first exclusive section and the second exclusive section based on operation targets of the at least one first operation and the at least one second operation, input information for the operation targets, or the variables.

3. The non-transitory computer-readable recording medium according to claim 2, the process further comprising:
   grouping one first operation and a successive another first operation when the operation targets are the same between the one first operation and the successive another first operation, when the input information for the operation target are the same between the one first operation and the successive another first operation, or when the variables are input from the one first operation to the successive another first operation, grouping the one first operation and the successive another first operation, wherein
   the setting includes setting the first exclusive section including the one first operation and the successive another first operation.

4. The non-transitory computer-readable recording medium according to claim 1, wherein,
   the priorities are calculated based on the operation importance level, a first value weighted according to a user starting the first workflow and the second workflow, a second value weighted according to a cause of a start of the first workflow and the second workflow, and a third value weighted according to time remaining until completion of the first workflow and the second workflow.

5. The non-transitory computer-readable recording medium according to claim 1, wherein
the executing includes transmitting notification of a specific workflow having a specific exclusive section with the highest priority.

6. The non-transitory computer-readable recording medium according to claim 1, the process further comprising:
outputting information that indicates any one of the first exclusive section and the second exclusive section that have been subject to the exclusion control.

7. A exclusion control apparatus comprising:
a memory which stores a program; and
a processor which executes, based on the program, a procedure comprising:
setting a first exclusive section in a first workflow and a second exclusive section in a second workflow, the first exclusive section including at least one first operation in which an exclusion control is executed, and the second exclusive section including at least one second operation in which the exclusion control is executed;
calculating priorities of the first exclusive section and the second exclusive section using operation importance level information indicating importance levels of the at least one first operation and the at least one second operation; and
executing the exclusion control between the first exclusive section and the second exclusive section based on the priorities, when a competition between the first exclusive section and the second exclusive section occurs, wherein
the setting includes joining the first exclusive section and a third exclusive section set in the first workflow when variables used in the at least one first operation and another variables used in a third operation included in the third exclusive section are the same, and dividing the first exclusive section into at least two segments when the variables are changed according to the first operation.

8. The exclusion control apparatus according to claim 7, wherein
the setting includes setting the first exclusive section and the second exclusive section based on operation targets of the at least one first operation and the at least one second operation, input information for the operation targets, or the variables.

9. The exclusion control apparatus according to claim 8, the procedure further comprising:
grouping one first operation and a successive another first operation when the operation targets are the same between the one first operation and the successive another first operation, when the input information for the operation target are the same between the one first operation and the successive another first operation, or when the variables are input from the one first operation to the successive another first operation, grouping the one first operation and the successive another first operation, wherein
the setting includes setting the first exclusive section including the one first operation and the successive another first operation.

10. The exclusion control apparatus according to claim 7, wherein
the priorities are calculated based on the operation importance level, a first value weighted according to a user starting the first workflow and the second workflow, a second value weighted according to a cause of a start of the first workflow and the second workflow, and a third value weighted according to time remaining until completion of the first workflow and the second workflow.

11. The exclusion control apparatus according to claim 7, wherein
the executing includes transmitting notification of a specific workflow having a specific exclusive section with the highest priority.

12. The exclusion control apparatus according to claim 7, the procedure further comprising:
outputting information that indicates any one of the first exclusive section and the second exclusive section that have been subject to the exclusion control.

13. A exclusion control method comprising:
setting a first exclusive section in a first workflow and a second exclusive section in a second workflow, the first exclusive section including at least one first operation in which an exclusion control is executed, and the second exclusive section including at least one second operation in which the exclusion control is executed;
calculating priorities of the first exclusive section and the second exclusive section using operation importance level information indicating importance levels of the at least one first operation and the at least one second operation; and
executing the exclusion control between the first exclusive section and the second exclusive section based on the priorities, when a competition between the first exclusive section and the second exclusive section occurs, wherein
the setting includes joining the first exclusive section and a third exclusive section set in the first workflow when variables used in the at least one first operation and another variables used in a third operation included in the third exclusive section are the same, and dividing the first exclusive section into at least two segments when the variables are changed according to the first operation.

14. The exclusion control method according to claim 13, wherein
the setting includes setting the first exclusive section and the second exclusive section based on operation targets of the at least one first operation and the at least one second operation, input information for the operation targets, or the variables.

15. The exclusion control method according to claim 14, the method further comprising:
grouping one first operation and a successive another first operation when the operation targets are the same between the one first operation and the successive another first operation, when the input information for the operation target are the same between the one first operation and the successive another first operation, or when the variables are input from the one first operation to the successive another first operation, grouping the one first operation and the successive another first operation, wherein
the setting includes setting the first exclusive section including the one first operation and the successive another first operation.

16. The exclusion control method according to claim 13, wherein the priorities are calculated based on the operation importance level, a first value weighted according to a user starting the first workflow and the second workflow, a second value weighted according to a cause of a start of the first workflow and the second workflow, and a third value weighted according to time remaining until completion of the first workflow and the second workflow.

17. The exclusion control method according to claim 13, wherein the executing includes transmitting notification of a specific workflow having a specific exclusive section with the highest priority.

18. The non-transitory computer-readable recording medium according to claim 1, wherein the priorities are calculated based on operation urgency level information that indicates urgency levels of the at least one first operation and the at least one second operation.

19. The exclusion control apparatus according to claim 7, wherein the priorities are calculated based on operation urgency level information that indicates urgency levels of the at least one first operation and the at least one second operation.

20. The exclusion control method according to claim 13, wherein the priorities are calculated based on operation urgency level information that indicates urgency levels of the at least one first operation and the at least one second operation.

* * * * *